United States Patent
Torok et al.

(10) Patent No.: US 10,904,665 B2
(45) Date of Patent: Jan. 26, 2021

(54) SELECTION OF MASTER DEVICE FOR SYNCHRONIZED AUDIO

(71) Applicant: Amazon Technologies, Inc., Seattle, WA (US)

(72) Inventors: Fred Torok, Mercer Island, WA (US); Michael Alan Pogue, Sunnyvale, CA (US); Vikram Kumar Gundeti, Bellevue, WA (US); Dharini Sundaram, Bothell, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 16/377,044

(22) Filed: Apr. 5, 2019

(65) Prior Publication Data

US 2019/0238983 A1 Aug. 1, 2019

Related U.S. Application Data

(63) Continuation of application No. 15/433,874, filed on Feb. 15, 2017, now Pat. No. 10,264,358.

(51) Int. Cl.
*H04R 3/12* (2006.01)
*G06F 3/16* (2006.01)
*H04R 27/00* (2006.01)

(52) U.S. Cl.
CPC .............. *H04R 3/12* (2013.01); *G06F 3/165* (2013.01); *G06F 3/167* (2013.01); *H04R 27/00* (2013.01);
(Continued)

(58) Field of Classification Search
CPC .... H04R 3/12; H04R 27/00; H04R 2227/005; H04R 2420/03; H04R 2420/07; G06F 3/165; G06F 3/167
(Continued)

(56) References Cited

U.S. PATENT DOCUMENTS 7,509,178 B2  3/2009  Logan et al.
7,916,877 B2  3/2011  Goldberg et al.
(Continued)

FOREIGN PATENT DOCUMENTS

| WO | WO2014043405 A1 | 3/2014 |
| WO | WO2015174753 A1 | 11/2015 |
| WO | WO2016204223 | 12/2016 |

OTHER PUBLICATIONS

Office Action for U.S. Appl. No. 15/433,953, dated Jun. 12, 2019, Torok, "Implicit Target Selection for Multiple Audio Playback Devices in an Environment", 25 pages.
(Continued)

*Primary Examiner* — William A Jerez Lora
(74) *Attorney, Agent, or Firm* — Lee & Hayes, P.C.

(57) ABSTRACT

Synchronized output of audio on a group of devices can comprise sending audio data from an audio distribution master device to one or more slave devices in the group. Scores can be assigned to respective audio playback devices, the scores being indicative of a performance level of the respective audio playback devices acting as a master device. The device with the highest score is designated as a candidate master device and one or more remaining devices are designated as a candidate slave(s). A throughput test is conducted with the highest scoring device acting as the candidate master device. The results of the throughput test are used to determine a master device for a group of devices. Latency of the throughput test can be reduced by using a prescribed time period for completion of the throughput test, and/or by selecting a first group configuration to passes the throughput test.

20 Claims, 15 Drawing Sheets

(52) U.S. Cl.
CPC .... *H04R 2227/005* (2013.01); *H04R 2420/03* (2013.01); *H04R 2420/07* (2013.01)

(58) Field of Classification Search
USPC ...................................... 381/79, 81, 182, 311
See application file for complete search history.

(56) References Cited

U.S. PATENT DOCUMENTS

| | | | |
|---|---|---|---|
| 9,176,520 | B2 | 11/2015 | Millington |
| 9,218,017 | B2 | 12/2015 | Millington |
| 9,431,021 | B1 | 8/2016 | Scalise et al. |
| 9,898,250 | B1 | 2/2018 | Williams et al. |
| 2003/0198257 | A1 | 10/2003 | Sullivan et al. |
| 2005/0288805 | A1 | 12/2005 | Moore et al. |
| 2006/0149850 | A1 | 7/2006 | Bowman |
| 2008/0162655 | A1 | 7/2008 | Khedouri et al. |
| 2009/0171487 | A1 | 7/2009 | Wilhelm |
| 2010/0299639 | A1 | 11/2010 | Ramsay et al. |
| 2012/0149471 | A1* | 6/2012 | Abe ................ H04R 27/00 463/41 |
| 2012/0237054 | A1 | 9/2012 | Eo et al. |
| 2013/0305903 | A1 | 11/2013 | Fong et al. |
| 2013/0317635 | A1 | 11/2013 | Bates et al. |
| 2014/0098713 | A1 | 4/2014 | Beckhardt et al. |
| 2015/0051723 | A1* | 2/2015 | Bates ................ H04N 21/8113 700/94 |
| 2015/0081068 | A1 | 3/2015 | Cheng |
| 2015/0170665 | A1* | 6/2015 | Gundeti ................ G06F 3/165 704/270.1 |
| 2015/0243283 | A1 | 8/2015 | Halash et al. |
| 2015/0334488 | A1 | 11/2015 | Kim et al. |
| 2016/0026429 | A1 | 1/2016 | Triplett |
| 2016/0155443 | A1 | 6/2016 | Khan et al. |
| 2017/0187771 | A1 | 6/2017 | Falcon |
| 2017/0195821 | A1 | 7/2017 | Lam |
| 2017/0242651 | A1 | 8/2017 | Lang et al. |
| 2017/0278480 | A1* | 9/2017 | Sung ................ G06F 3/167 |
| 2018/0018964 | A1 | 1/2018 | Reilly et al. |
| 2018/0070187 | A1 | 3/2018 | Drinkwater et al. |
| 2018/0084456 | A1* | 3/2018 | Gostev ................ H04W 84/18 |
| 2018/0108351 | A1 | 4/2018 | Beckhardt et al. |
| 2018/0121158 | A1 | 5/2018 | Hinokio et al. |
| 2018/0146236 | A1 | 5/2018 | Iyer et al. |
| 2018/0205508 | A1 | 7/2018 | Burchard et al. |
| 2018/0233136 | A1 | 8/2018 | Torok et al. |
| 2018/0233137 | A1 | 8/2018 | Torok et al. |
| 2018/0234765 | A1 | 8/2018 | Torok et al. |

OTHER PUBLICATIONS

Non Final Office Action dated Jan. 28, 2019 for U.S. Appl. No. 15/433,920, "Audio Playback Device That Dynamically Switches Between Receiving Audio Data From a Soft Access Point and Receiving Audio Data From a Local Access Point" Torok, 36 pages.
Non Final Office Action dated Nov. 26, 2018 for U.S. Appl. No. 15/433,953 "Implicit Target Selection for Multiple Audio Playback Devices in an Environment" Torok, 23 pages.
PCT Invitation to Pay Additional Fess dated Apr. 3, 2018 fro PCT Application No. PCT/US18/18233, 2 pages.
The PCT Search Report and Written Opinion dated Jun. 14, 2018, for PCT Application No. PCT/US18/18233, 17 pages.
The Partial Supplementary European Search Report dated Jul. 14, 2020 for European Application No. 18753983.8, 13 pages.

* cited by examiner

SELECTION OF MASTER DEVICE FOR SYNCHRONIZED AUDIO

CROSS REFERENCE TO RELATED APPLICATION

This application is a continuation of co-pending, commonly owned U.S. patent application Ser. No. 15/433,874, filed Feb. 15, 2017, and entitled "SELECTION OF MASTER DEVICE FOR SYNCHRONIZED AUDIO," the entirety of which is herein incorporated by reference.

BACKGROUND

As computing devices evolve, so do the ways users are able to interact with them, such as through mechanical devices (e.g., keyboards, mice, etc.), touch screens, motion, and gesture. Another way to interact with computing devices is through natural language input using speech and computer vision-based input using gestures and movements.

Some computing devices are capable of audio output and are used for playback of music and other audio content. Natural language input has made it easy for users to initiate playback of audio content on these connected devices. Additionally, content streaming services are used for audio playback by providing users with a library of audio content. In some cases, users leverage multiple connected devices as a group of devices for synchronized output of audio. Discussed herein are technological improvements for, among other things, these connected devices and systems.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

DETAILED DESCRIPTION

Figure 1A:
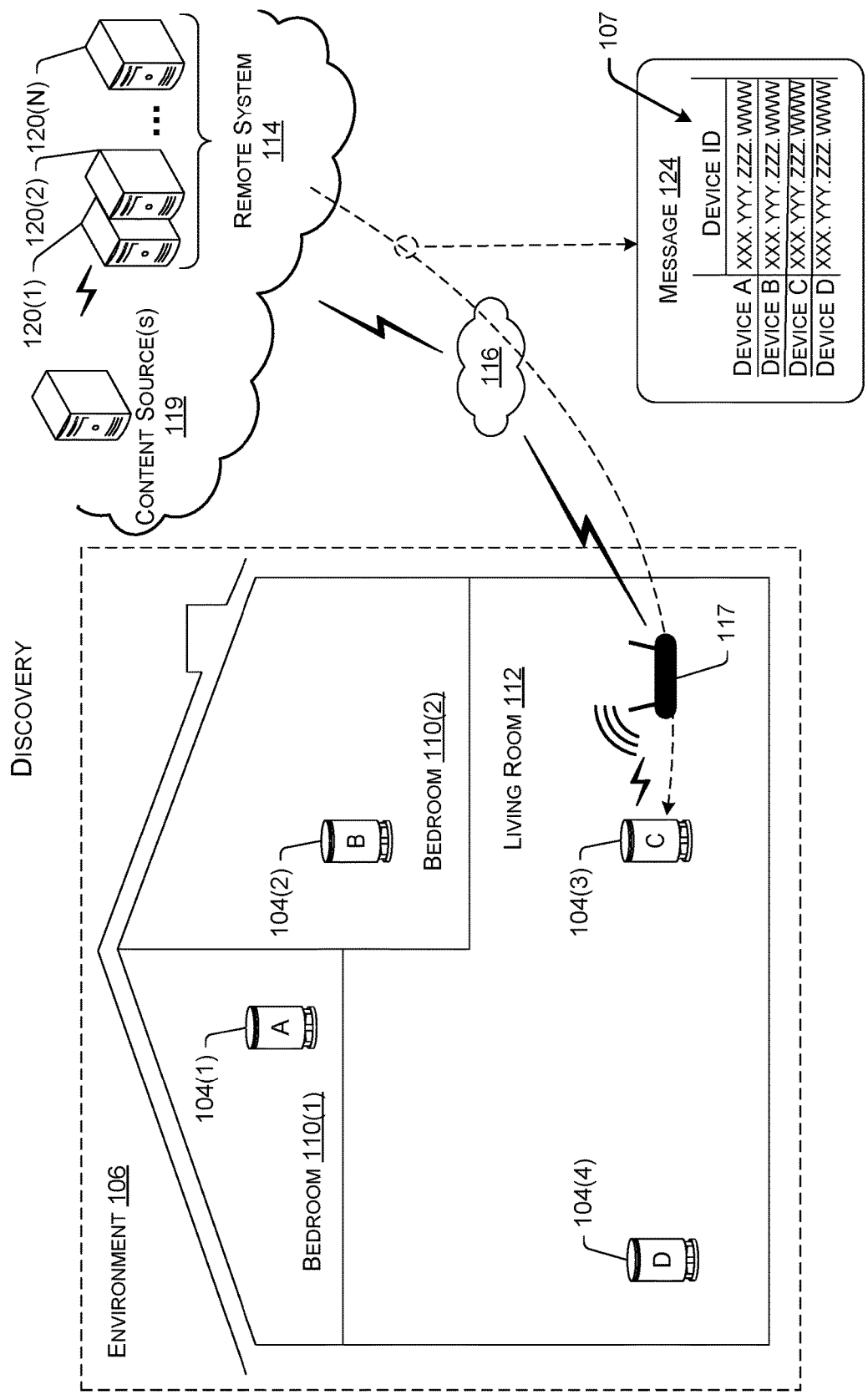
FIG. 1A is a schematic diagram of an illustrative system architecture that includes multiple audio playback devices in an environment during discovery.

This disclosure is directed to systems, devices, and techniques pertaining to audio playback devices configured to output audio in a synchronized manner. A plurality of audio playback devices may exist in an environment. An individual audio playback device is sometimes referred to herein as a "voice-controlled device" when it has the ability to receive voice commands from a user in the environment, and/or to cause performance of operations based on the voice commands. An individual audio playback device is also considered a "connected" (or "network connectable") device when it is able to be coupled to a network device (e.g., connected to a network device as part of a local area network (LAN), as part of a wireless area network (WAN), etc.) and/or communicate with other devices via short-range wireless radio communication (e.g., Bluetooth, Zigbee, etc.).

Two or more audio playback devices in the environment can form a group of devices for purposes of outputting audio in a synchronized manner. In the process of forming a group, a first audio playback device is designated as a master device (or "audio distribution master device") and one or more remaining audio playback devices in the to-be-formed group are designated as slave devices. Upon designation as the audio distribution master device, the master device is configured to receive audio data (e.g., an audio file or uniform resource locator (URL) of where audio data will be streamed) from a content source (e.g., a remote content source), and send the audio data to the one or more slaves in the group so that each audio playback device in the group can begin playback of the audio data within a particular time period (e.g., within 5 ms when at least two audio playback devices are in different rooms of a structure, such as a house, or within 150 microseconds (µs) in a left-right stereo pair of audio playback devices, which may be in a same room, or a same general vicinity, etc.) for synchronized output of audio by the group of devices.

Described herein are systems, devices, and techniques for selecting an audio distribution master device in a to-be-formed group of audio playback devices with very little latency. For instance, an existing technique tests each audio playback device, in turn, as an audio distribution master device by measuring data throughput at the test slave(s) to determine which audio playback device is best suited for the role of the audio distribution master device. For large groups of devices, this existing process can take a (relatively) considerable amount of time to complete because throughput is measured for each audio playback device acting as the audio distribution master device.

Accordingly, a process for conducting a throughput test for a group of audio playback devices can include determining scores for audio playback devices in the to-be-formed group, wherein the score determined for an audio playback device is indicative of, for example, a performance level of the audio playback device acting as an audio distribution master device. The score can be based on one or more factors, including, for example, a signal strength value between the audio playback device and a wireless access point (WAP) in the environment. The scores allow the audio playback devices to be ranked in order according to their likely ability to perform well as an audio distribution master device. Accordingly, a throughput test can be conducted by designating, in ranked order, individual audio playback devices as candidate audio distribution master devices for testing purposes. For example, if it is determined that a first score assigned to a first audio playback device is higher than a second score assigned to a second audio playback device, the first audio playback device is designated as the first candidate audio distribution master device, and the second audio playback device is designated as the first candidate slave device, and the second audio playback device receives an amount of data from the first audio playback device to determine a data throughput value. If the data throughput value determined by the second audio playback device is greater than a predefined threshold, the first audio playback device can be selected as the audio distribution master device. In response to a command, an audio file can be received at the first audio playback device from a content source for synchronized output of audio of the audio file by the first and the second audio playback devices in the environment as a group.

Latency (e.g., time to completion) of the throughput test can be reduced by taking the first group configuration to pass the throughput test (e.g., by the data throughput value exceeding the predefined threshold) as an acceptable group configuration. In this manner, the candidate audio distribution master device in the group configuration that first passes the throughput test is selected as the audio distribution master device of the group, without determining additional data throughput values for other audio playback devices acting as candidate audio distribution master devices. Latency of the throughput test can also be reduced by using a timer that is to run for a predetermined time period. As many rounds of the throughput test as possible can be conducted within the predetermined time period, where each round moves down the ranked order of audio playback devices and tests devices, in turn, as candidate audio distribution master devices. After the predetermined time period has lapsed, the test results of the group configurations that passed the throughput test can be evaluated in order to select the best performing audio playback device as the audio distribution master device. By using the time period, the time to complete the throughput test is reduced to a suitable time period that can be shorter, in many instances, than a time period to test each audio playback device as a master device, especially in large groups with many audio playback devices.

This disclosure is also directed to systems, devices, and techniques for reducing bandwidth consumption at individual audio playback devices in a group by dynamically switching between receipt of audio data at a slave device via a soft WAP and via a WAP in the environment. For instance, a group of audio playback devices can be connected with a WAP(s) in the environment according to a hybrid topology where the audio distribution master device in the group acts as a soft WAP. Slave devices that are connected directly to the soft WAP are configured to receive audio data directly from the soft WAP (i.e., the audio data sent from the soft WAP is not routed through the WAP in the environment). Other slave devices can be connected to the WAP such that audio data received from the audio distribution master is routed to those slave devices via the WAP. In some instances, bandwidth consumption at the audio distribution master can increase to a point where performance of the audio distribution master is significantly degraded. This may occur when a slave device that is directly connected to the soft WAP switches from group mode to individual mode without changing its configuration of receiving audio data directly from the soft WAP. If many slave devices that are directly connected to the soft WAP are toggled to individual mode without changing their configurations in this manner, each slave can receive audio data directly from the soft WAP, and performance of the audio distribution master can significantly degrade due to the increased bandwidth consumption at the audio distribution master.

Accordingly, a first audio playback device may be configured to act as a soft WAP in an environment with a second audio playback device and a WAP. A first user input may be received that requests audio playback by a group of devices including the first and the second audio playback device. A first command may be generated based on the first user input that includes an audio playback operation, a first content identifier, and a first target identifier associated with the first and the second audio playback devices. The first audio playback device, acting as the audio distribution master device, receives a first audio file via the WAP in the environment, and the second audio playback device, acting as a slave device receives the first audio file directly from the first audio playback device without routing the first audio file through the WAP. With the first audio file distributed to the second audio playback device, the first and the second audio playback devices can output audio of the first audio file in a synchronized manner.

Subsequently, a second user input may be received that requests audio playback by the second audio playback device individually. A second command may be generated based on the second user input that includes the audio playback operation, a second content identifier, and a second target identifier that is associated with the second audio playback device, but not with the first audio playback device. In this instance, the second audio playback device has been switched from operating in group mode along with the first audio playback device, to operating in individual mode. Accordingly, the second audio playback device can dynamically switch its configuration by receiving a second audio file from the content source and via the WAP, without routing the second audio file through the first audio playback device. Audio of the second audio file is then output by the second audio playback device. Notably, when the second audio playback device is switched to individual mode and starts receiving audio data via the WAP (and bypassing the master device), resources of the master device are freed up, thereby reducing bandwidth consumption at the master device as a result.

This disclosure is also directed to systems, devices, and techniques for selecting a target output device (or group of devices) among a plurality of audio playback devices in instances where a voice command is determined that does not specify any target for audio output. For example, a user may issue a voice command by speaking the utterance "Play music by Joe Songbird," without specifying the audio playback device(s) on which the user desires the music to be played from. In this instance, a target selection algorithm uses one or more criterion to select an implicit target device(s). In some configurations, the criterion is met if a predetermined time period has lapsed since a previous voice command. Using the time period criterion, a timer can be started upon receipt of a voice command that specifies a target device (or group of devices) among a plurality of audio playback devices, the timer to run for a predetermined time period. If a subsequent voice command is issued without specifying a target device(s) (e.g., "Play music by Joe Songbird"), and the predetermined time period has not lapsed at a time of, or before, detection of the subsequent voice command, the implicit target is selected as the same target specified in the previously detected voice command. Thus, if a user issues a first voice command "Play music by Joe Songbird Everywhere"—"Everywhere" being a name of a group comprising all of the user's registered audio playback devices in the environment—a timer is started, and a when a second voice command "Play music by Jill Musician" is detected before a lapse of the predetermined time period, the implicit target is selected as the "Everywhere" group. If, on the other hand, the predetermined time period has lapsed at a time of, or before, detection of the second voice command in the previous example, a different implicit target can be selected for output of the audio, such as a default device (or group of devices), or a preferred device (or group of devices) stored in preferences.

For purposes of discussion, examples are used herein primarily for illustrative purposes. For example, the techniques described herein are often described with reference to playback of audio content comprising music. However, it is to be appreciated that the techniques and systems described herein may be implemented with any suitable audio content, such as audio books, podcasts, or any suitable audio content.

FIG. 1A is a schematic diagram of an illustrative system architecture 100 including multiple audio playback devices 104 within an environment 106 that can be used for synchronized audio playback. FIG. 1A illustrates a discovery process that is performed when a device 104 is first brought online (or in response to a significant change in device-related information, described below). The discovery process shown in FIG. 1A is configured to assist in the sharing of information between devices 104 (e.g., communication between the devices 104) that are registered to a user. For example, when an audio playback device 104 first boots and comes online, the device 104 can send a device identifier 107 to a remote system 114. The device identifier can include, without limitation, an Internet Protocol (IP) address of the device 104, a media access control (MAC) address, or any other suitable device identifier identifying the device 104. Any suitable networking protocol can be utilized for transmitting information from the device 104 to the remote system 114. At least one reason for utilizing the remote system 114 for assistance in discovery of devices 104 in the environment 106 is due to the various possible network configurations that sometimes do not allow devices 104 in the environment 106 to "see" one another via the LAN (e.g., multiple wireless access points (WAPs) 117 may block discovery message packets between two devices 104 in the environment 106, discovery packets may not transcend sub-nets within the LAN, etc.).

The device identifier 107 received by the remote system 114 can be retained in storage of the remote system 114 for use by all of the devices 104 in the environment 106 that are registered to a user. The device identifiers 107 maintained in the remote system's 114 storage can also be used by a client-side application executable on a user's computing device, which may provide the user with information about which devices 104 are currently online at any given point in time.

The remote system 114 can send messages (e.g., serialized notify_change( ) messages) to the devices 104 in the environment 106, so that devices 104 can update their individual connectivity information maintained in local storage of the device 104. For example, a message 124 received by the device 104(3) (or "device C") from the remote system 114 may include the device identifiers 107 (e.g., the IP addresses) of the other devices 104(1), 104(2), and 104(4) (or "devices A, B, and D") in the environment 106 so that the device 104(3) is made aware of the other devices 104 and knows how to communicate with them using the device identifiers 107 (e.g., IP addresses). In some embodiments, the remote system 114 may query devices 104 registered to a user for current device identifier 107 information. Alternatively, the remote system 114 may access a customer registry maintained in the remote system's 114 storage in association with a particular user, the customer registry including the devices 104 (e.g., the devices 104(1)-(4) of FIG. 1A) registered to a user. In this manner, the remote system 114 maintains a mapping from registered devices 104 to the user.

In response to receipt, at a device 104(3), of the message 124 from the remote system 114 that includes the device identifiers 107 of the other online devices 104 in the environment 106, the device 104(3) can share additional discovery information about the device 104(3) with the remaining devices 104 in the environment 106, via the LAN in the environment 106 and/or via the remote system 114. The additional discovery information shared amongst the devices 104 in the environment 106 can include, without limitation, a signal strength value as measured between a device 104 and a local WAP 117 (e.g., Received Signal Strength Indication (RSSI) value), a device type, a service set identifier (SSID) of the WAP 117, a basic SSID (BSSID) of the WAP 117, security keys (e.g., for private transmission of data between devices 104 via the LAN in the environment 106), and so on. Some or all of this additional discovery information can be used to select one or more master devices for time synchronization (time master) and/or audio distribution (audio distribution master) purposes. Anytime there is a significant change to the device identifier 107 and/or the additional discovery information from the device-side, an update message can be sent to the remote system 114, and the remote system 114 can update the devices 104 in the environment 106 (including the device 104 that initiated the change). For example, if the IP address of the device 104(4) changes, the device 104(4) can send an update message to the remote system 114. As another example, if the difference between an initial signal strength measurement (signal strength value) between the device 104(4) and the WAP 117 and a subsequent signal strength measurement (signal strength value) between the device 104(4) and the WAP 117 is greater than a predefined signal strength difference threshold, an update message can be sent by the device 104(4) to the remote system 114. This may occur when a user relocates a device 104 within the environment 106. After discovery, devices 104 in the environment 106 are aware of the other devices 104 in the environment 106, and know how to contact and communicate with the other devices 104 in the environment 106.

Figure 1B:
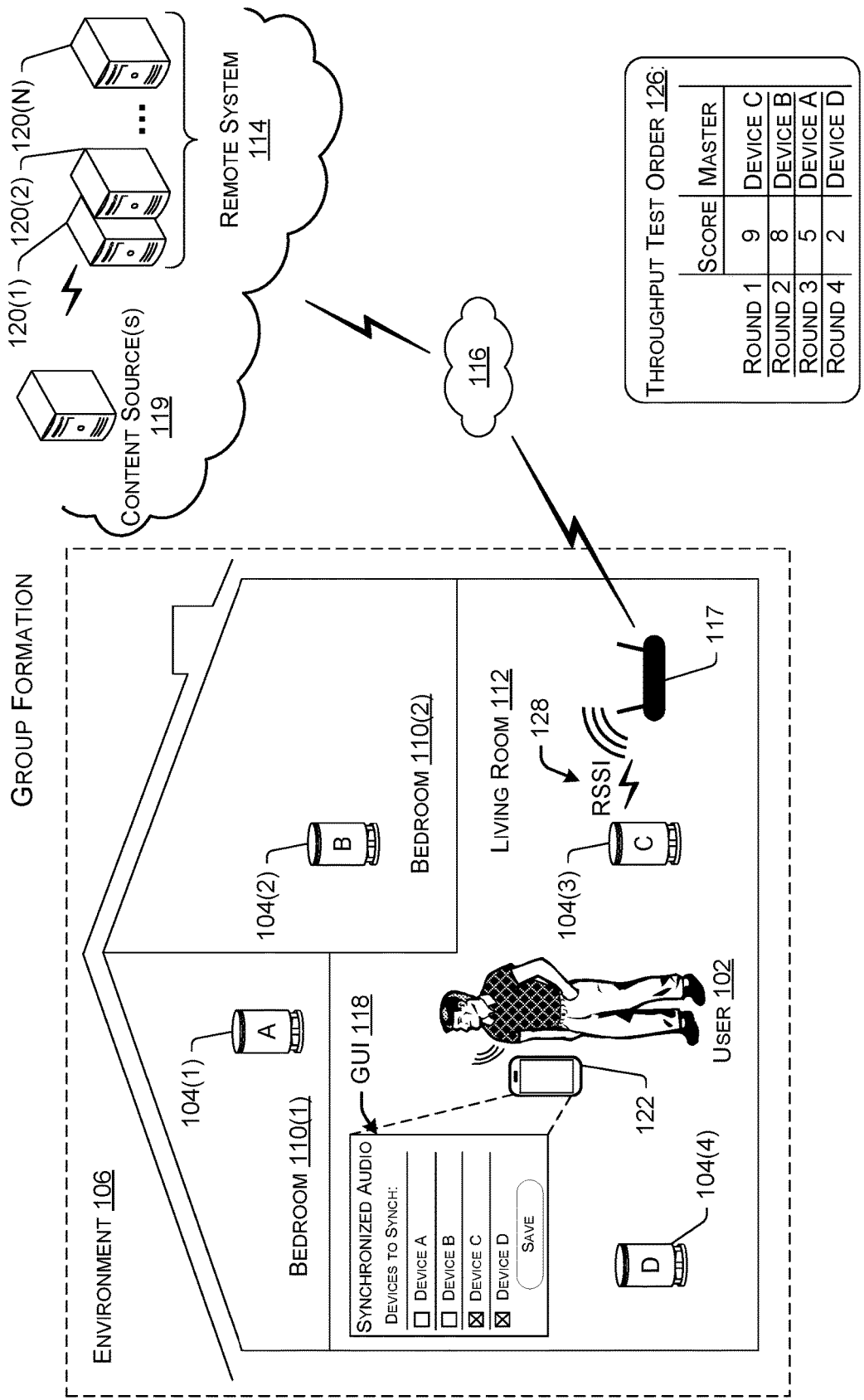
FIG. 1B is a schematic diagram of the illustrative system architecture of FIG. 1A in which a user issues a request to create a group of audio playback devices in an environment, and, in response, a throughput test is conducted using a technique that reduces latency of the throughput test.

FIG. 1B is a schematic diagram of the illustrative system architecture 100 of FIG. 1A in which a user 102 can issues voice commands to the audio playback devices 104 in an environment 106 in order to control the operation of one or more of the audio playback devices 104. FIG. 1B assumes that the discovery process of FIG. 1A has already taken place such that the device identifiers 107 of the devices 104 registered to the user 102, and present in the environment 106, are known to the devices 104 in the environment 106. The environment 106 in FIGS. 1A and 1B can include any suitable area where a plurality of audio playback devices 104 are located. The example environment 106 of FIGS. 1A and 1B is shown as including the audio playback devices 104(1), 104(2), 104(3), and 104(4) (collectively 104), also labeled as devices "A", "B", "C", and "D", respectively, in FIGS. 1A and 1B. FIGS. 1A and 1B show an example of an environment 106 comprising a house with multiple rooms, which may represent a place of residence of the user 102. For example, the device 104(1) (or "device A") may be located in a first bedroom 110(1) of the house, the device 104(2) (or "device B") may be located in a second bedroom 110(2) of the house, and the devices 104(3) and 104(4) (or "devices C and D," respectively) may be located in a living room 112 of the house. Accordingly, the environment 106 can comprise a physical structure, such as a building, a house, or a similar structure, but the environment 106 is not limited to physical structures. For example, the environment 106 can comprise an outdoor environment where the audio playback devices 104 are located. It is to be appreciated that FIGS. 1A and 1B are provided to aid in comprehension of the disclosed techniques and systems. As such, it should be understood that the discussion herein is non-limiting.

The user 102 may control one or more of the audio playback devices 104 within the environment 106 by using voice commands that are detected by the individual audio playback devices 104. For instance, if the user 102 would like to play music on a particular audio playback device 104, such as the device 104(4) (or "device D"), the user 102 may issue a voice command to the audio playback device 104(4) to "play music by Joe Songbird on device D". The audio playback device 104(4) may, in response to the voice command, interact with the remote system 114 by transmitting/receiving data over a computer network(s) 116 to cause the device 104(4) to perform the requested operation with the assistance of the remote system 114.

FIGS. 1A and 1B illustrate that the devices 104 may couple with the remote system 114 over the network 116. FIGS. 1A and 1B also show that the wireless access point (WAP) 117 may enable the coupling of the individual devices 104 to network devices of the network 116. The network 116 may represent an array of wired networks, wireless networks (e.g., WiFi), or combinations thereof. The remote system 114 may generally refer to a network-accessible platform—or "cloud-based service"—implemented as a computing infrastructure of processors, storage, software, data access, and so forth that is maintained and accessible via the network 116, such as the Internet. Cloud-based services may not require end-user knowledge of the physical location and configuration of the system that delivers the services. Common expressions associated with cloud-based services, such as the remote system 114, include "on-demand computing", "software as a service (SaaS)", "platform computing", "network accessible platform", and so forth.

An individual audio playback device 104 may detect input audio based on an utterance spoken by the user 102, send audio data to the remote system 114, and the device 104, or another device 104, may receive a command from the remote system 114 in response to sending the audio data. Upon the device 104 receiving the command, the device 104 (or a group of the devices 104) can operate in a particular manner, such as by outputting audio (e.g., audio of an audio file corresponding to an artist requested by the user 102, audio of a text-to-speech (TTS) translation of a text response to a query made by the user 102, etc.). An audio file corresponding to audio content, such as music, may be retrievable from a content source(s) 119, which may be remotely located from the environment 106. Such remote (or cloud-based) content sources 119 are commonly known as content streaming sources where the user 102 subscribes to a service allowing the user 102 to access a library of audio files made available to the user 102 from the content sources 119. The content source(s) 119 may be part of the same system as the remote system 114, or the content source(s) 119 may be a separate system 119 that is made accessible to the remote system 114. Additionally, or alternatively, the content source(s) 119 may be located in the environment 106, such as a personal database of audio files that the user 102 can access for playback via one or more of the devices 104 in the environment 106. As such, receiving content from the content source(s) 119, as described herein, can comprise receiving the content directly from the content source(s) 119, or via the remote system 114, and possibly over the network 116 via the WAP 117.

In any case, the user 102 can create groups of devices, and can control the groups of the devices 104 using his/her voice. In the example of FIG. 1B, the user 102 wishes to create a group of the devices 104 such that the devices 104 in the group are later controllable by individual voice commands.

Accordingly, the user 102 is able to create a group of devices 104 using a graphical user interface (GUI) 118 rendered on a display of a computing device 122 associated with the user 102, such as a GUI 118 rendered on a display of a mobile phone, a tablet, a television (and set-top-box, game console, etc.), or the like. In some instances, the remote system 114 may provide data (e.g., a web browser, a client application, etc.) for displaying the GUI 118 to the computing device 122. As an example, the GUI 118 may provide a list of devices 104 that have been registered to the user 102, and may provide selection elements on the GUI 118 that are associated with individual devices 104 to enable the creation of a group of devices 104 from the devices in the list, as shown by the GUI 118 in FIG. 1B.

Alternatively, the user 102 can speak a natural language command, such as "Create a group named 'Everywhere', including all of my audio playback devices." The input audio (i.e., sound waves) corresponding to the natural language command may be captured by one or more microphone(s) of the device 104(4) due to the proximity of the device 104(4) to the user 102 when the utterance is spoken. In some implementations, the device 104(4) may process the captured audio. In other implementations, some or all of the processing of the input audio may be performed by additional computing devices 120(1), 120(2), . . . , 120(N) (collectively 120) of the remote system 114, which are accessible to the device 104(4) over the network(s) 116. In some configurations, the device 104(4) is configured to identify a predefined "wake word" (i.e., a predefined utterance).

Upon the device 104 identifying the user 102 speaking the predefined wake word (in some instances), the device 104 may begin uploading audio data (representing the audio captured in the environment 106) to the remote system 114 over the network 116. In response to receiving this audio data, one or more computing devices 120 of the remote system 114 may begin performing automated speech recognition (ASR) on the audio signal to generate text, and may perform natural language understanding (NLU) on the generated text to determine one or more voice commands. For instance, the remote system 114 may determine, based on the audio data received from the device 104(4) over the network 116, that the user 102 is requesting to create the group of devices 104 including all of the user's 102 registered audio playback devices 104. Although FIG. 1 depicts a user 102 having four devices 104, the techniques and systems described herein are of course not limited to the exemplary number of devices 104 shown in FIGS. 1A and 1B, and the user 102 can instead possess any number of audio playback devices 104 less than or greater than four devices 104.

In response to the user's 102 request to create a group of devices 104, the remote system 114, or one or more of the devices 104, may be configured, among other things, to initiate a throughput test for the group of devices 104. For example, the remote system 114 can send a message to a particular device 104 in the to-be-formed group of devices 104 to initiate the throughput test, or one of the devices 104 can be designated as the "test master" using any suitable selection algorithm (e.g., the device 104 having the lowest numerical device identifier 107 (e.g., IP address), etc.).

Prior to initiating the throughput test, a throughput test order 126 may be determined. The throughput test order 126 indicates which device 104 in the to-be-formed group is to be tested as an audio distribution master for individual rounds of the throughput test. The throughput test order 126 can be determined by the remote system 114, by one or more devices 104 (e.g., by the designated "test master" device 104), or partly by the remote system 114 and partly by one or more of the devices 104. The throughput test order 126 is determined according to respective scores that are assigned to individual devices 104 based on one or more factors or metrics, the respective scores being indicative of an expected performance level of the respective audio playback device 104 acting as an audio distribution master device. For example, one of possibly several factors on which the scores can be based comprises a signal strength 128 (e.g., Received Signal Strength Indication (RSSI) value, which can be measured in decibel-milliwatts (dBm)) between the respective audio playback device 104 and the WAP 117 in the environment 106. In some embodiments, the signal strength 128 value reported by a given device 104 may be measured by the device 104 determining a device identifier of the WAP 117 and averaging multiple signal strength values measured over a period of time. Signal strength values may comprise historical measurements that are periodically measured, or measured in response to trigger events. The multiple signal strength measurements that are averaged to calculate the signal strength 128 value can represent measurements that are made over relatively recent period of time at a time when the signal strength 128 value is to be reported to the remote system 114, or to a different device in the environment 106. This is based on the notion that a higher signal strength between the audio playback device 104 and the WAP 117 is an indicator that the audio playback device 104 will perform well as an audio distribution master device (e.g., send audio data to one or more slave devices 104 (in some cases simultaneously to multiple slave devices 104) at a suitable throughput, such as a throughput at or above 512 kilobits per second (kbps)), seeing as how a higher signal strength 128 between a device 104 and the WAP 117 likely corresponds to a higher bandwidth at the device 104 for distributing audio data to the remaining devices in the group. As used herein, "distributing" audio data can include, without limitation, determining where to send the audio data (e.g., using a mapping or other data structure), and sending the audio data to one or more devices 104 using any suitable wireless protocol. In some embodiments, an example computation of a score based on a signal strength 128 value as measured between the audio playback device 104 and the WAP 117 in the environment 106 includes dividing a predefined negative value (e.g., −1500) by the signal strength 128 value, and possibly rounding the raw score to a nearest decimal point or whole number. This example computation is suitable for use with an RSSI measurement, which is typically measured as a negative value in units of dBm, where a negative RSSI value that is closer to 0 is considered a stronger signal than an RSSI value that is farther from 0. For example, using the example formula, above, a first signal strength 128 value of RSSI=−50 dBm would correspond to a score of 30 (e.g., 30=(−1500)÷(−50)), while a second signal strength 128 value of RSSI=−30 dBm would correspond to a score of 50 (e.g., 50=(−1500)÷(−30)). Therefore, a first audio playback device 104(1) with an RSSI=−50 dBm would be ranked lower than a second audio playback device 104(3) with an RSSI=−30 dBm because the first audio playback device 104(1) would receive a score of 30, while the second audio playback device 104(3) would receive a score of 50.

The throughput test is designed to ensure that the individual devices 104 and the local area network (LAN) in the environment 106 (all working together) are likely to provide a high-quality audio experience during synchronized output of audio by the group of devices 104. Because synchronized output of audio can be implemented by designating one of the devices 104 in the group as an audio distribution master device that distributes audio data (e.g., an audio file) to the remaining devices 104 in the group (which are designated as slave devices), the throughput test ensures that there is at least one device 104 in the to-be-formed group of devices 104 that can transmit audio data simultaneously to a number of slave devices in the group at a suitable data throughput rate (e.g., above a predefined throughput threshold, per slave device).

However, rather than testing each device 104 as an audio distribution master device in an arbitrary order, the technique shown in the example of FIG. 1B is designed to intelligently order the devices 104 according to their likely performance level as an audio distribution master device. Accordingly, the "best" candidate master device can be tested first, and the "worst" candidate master device can be tested last. In some configurations, the throughput test is designed to conduct individual "rounds" for individual devices 104, according to the throughput test order 126, measuring data throughput at one or more slaves during an individual round. The throughput test may complete upon determining a first device 104 that passes the throughput test, and forming the group with the first device 104 designated as the audio distribution master device without conducting any additional rounds or taking any additional data throughput measurements prior to group formation. In this manner, the throughput test can be conducted with very little latency as compared to existing throughput tests that spend any and all time necessary to test each and every device 104 in the to-be-formed group in order to determine the best audio distribution master. Alternatively, a predetermined period of time can be set for test completion, and the throughput test may complete within the predetermined time period to avoid spending any additional time testing devices 104 beyond the predetermined time period. For instance, a timer can be started at the beginning of the throughput test, and the group of devices 104 can conduct as many rounds as possible within the predetermined time period, passing all group configurations that pass the throughput test within the predetermined time period. Thereafter, the best audio distribution master device can be selected from amongst the passing group configurations that passed the throughput test within the predetermined time period. This also reduces latency of the throughput test by limiting the completion of the throughput test to a predetermined time period. For instance, the time period can be set to a value that allows for the test to complete before all of the devices 104 in the to-be-formed group can be tested as an audio distribution master, which is particularly useful for reducing throughput test latency in large groups of devices (e.g., 10 or more devices 104 in the environment 106). It is to be appreciated that these reduced latency techniques can be implemented without the scoring and ranking the devices 104 in the throughput test order 126, and instead, designating a master device to test using a different technique that does not involve scoring the devices 104 (e.g., by selecting devices from lowest to highest device identifier 107, or vice versa, or any other throughput test order 126).

Figure 2:
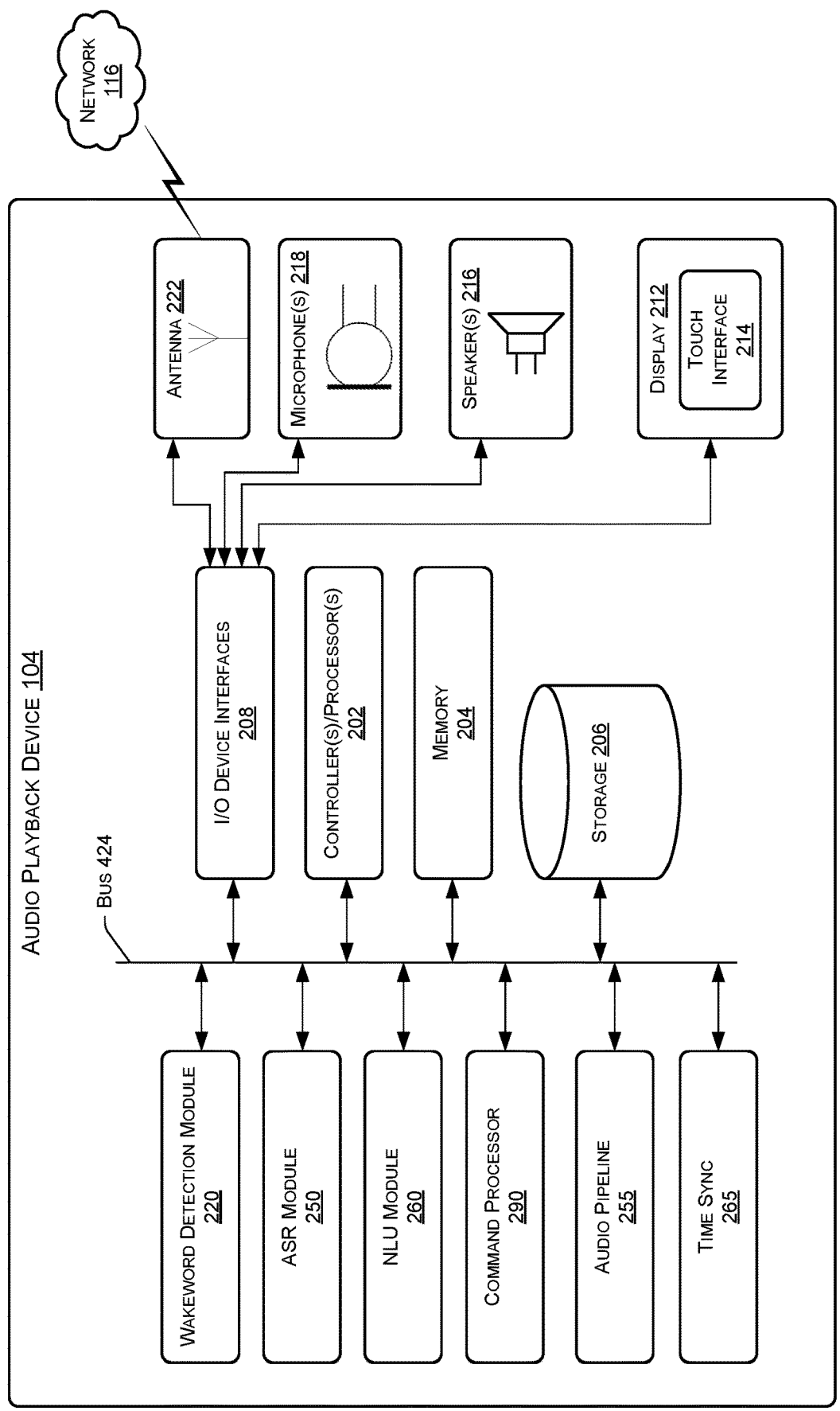
FIG. 2 illustrates a functional block diagram of computer components implemented at an audio playback device according to embodiments described herein.
Figure 3:
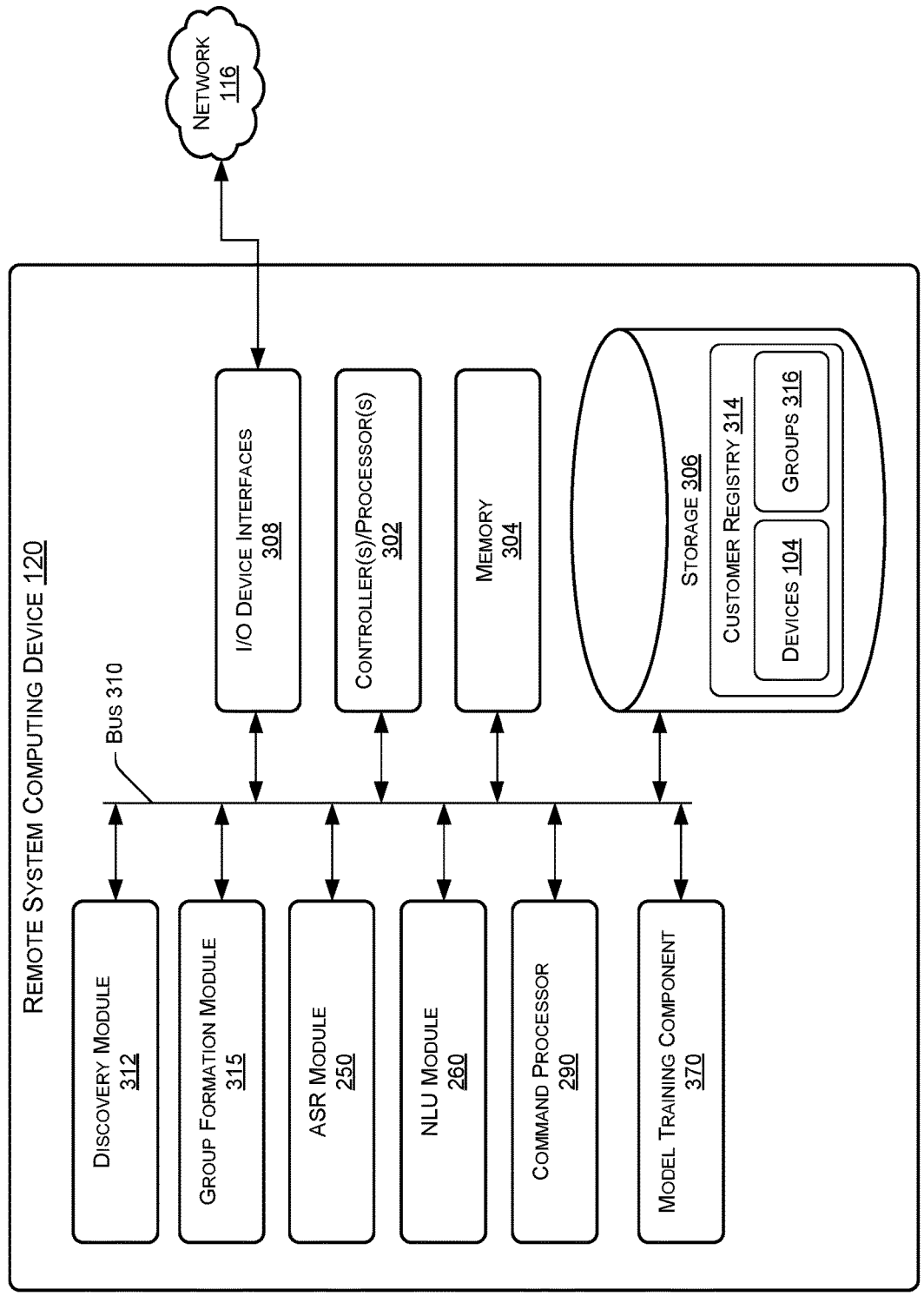
FIG. 3 illustrates a functional block diagram of computer components implemented at a computing device(s) of a remote system according to embodiments described herein.

FIG. 2 is a block diagram conceptually illustrating an audio playback device 104 of FIG. 1 that may be used with the described system. FIG. 3 is a block diagram conceptually illustrating example components of a remote computing device 120 of the remote system 114 of FIG. 1 that may assist with ASR, NLU processing, group formation, and/or command processing for synchronized audio playback. Multiple such computing devices 120 may be included in the remote system 114, such as one computing device(s) 120 for training ASR models, one computing device(s) 120 for performing ASR, one computing device(s) 120 for performing NLU, one computing device(s) 120 for processing synchronized audio playback commands, etc. In operation, individual devices (104/120) may include computer-readable and computer-executable instructions that reside on the respective device (104/120), as will be discussed further below.

Individual devices (104/120) may optionally include one or more controllers/processors (202/302), which may individually include a central processing unit (CPU) for processing data and computer-readable instructions, and may optionally include a memory (204/304) for storing data and instructions of the respective device. The memories (204/304) may individually include volatile random access memory (RAM), non-volatile read only memory (ROM), non-volatile magnetoresistive (MRAM) and/or other types of memory. Individual devices (104/120) may also optionally include a data storage component (206/306), for storing data and controller/processor-executable instructions. The data storage component may individually include one or more non-volatile storage types such as magnetic storage, optical storage, solid-state storage, etc. Individual devices (104/120) may also be connected to removable or external non-volatile memory and/or storage (such as a removable memory card, memory key drive, networked storage, etc.) through respective input/output device interfaces (208/308).

Computer instructions for operating individual devices (104/120) and its various components may be executed by the respective device's controller(s)/processor(s) (202/302), using the memory (204/304) as temporary "working" storage at runtime. A device's computer instructions may be stored in a non-transitory manner in non-volatile memory (204/304), storage (206/306), or an external device(s). Alternatively, some or all of the executable instructions may be embedded in hardware or firmware on the respective device in addition to or instead of software.

Individual devices (104/120) may optionally include input/output device interfaces (208/308). A variety of components may be connected through the input/output device interfaces (208/308), as will be discussed further below. Additionally, individual devices (104/120) may optionally include an address/data bus (210/310) for conveying data among components of the respective device. Individual components within a device (104/120) may also be directly connected to other components in addition to (or instead of) being connected to other components across the bus (210/310).

Referring to the device 120 of FIG. 3, the device 120 may optionally include a discovery module 312 that is configured to implement the discovery process described with reference to FIG. 1A. The discovery module 312 can represent one or more services and/or one or more application programming interfaces (APIs) configured to implement the functions and techniques described herein with reference to the discovery module 312. The discovery process assists in the discovery of a new device 104 when the device 104 is first brought online (or in response to a significant change in device-related information), and to assist in the sharing of information between devices 104 (e.g., communication between the devices 104) that are registered to a user 102. For example, when an audio playback device 104 first boots and comes online, the device 104 can send a device identifier 107 to the remote system 114 that is received by the discovery module 312.

The device identifier 107 received by the discovery module 312 can be retained in the storage 306 for use by all of the devices 104 in the environment 106 that are registered to the user 102. The device identifiers 107 maintained in the storage 306 can also be used by a client-side application executable on the user's 102 computing device 122, which may provide the user 102 with information about which devices 104 are currently online at any given point in time. The discovery module 312 can send messages (e.g., serialized notify_change( ) messages) to the devices 104 in the environment 106, so that devices 104 can update their individual connectivity information maintained in local storage 206 of the device 104. For example, the message 124 described with reference to FIG. 1A can be sent from the discovery module 312, and may include the device identifiers 107 (e.g., the IP addresses) of the devices 104 in the environment 106 so that any individual device 104 is made aware of the other devices' 104 device identifiers 107 and knows how to communicate with them using the device identifiers 107. In some embodiments, the discovery module 312 may query individual devices 104 registered to the user 102 for current device identifier 107 information. Alternatively, the discovery module 312 may access a customer registry 314 maintained in storage 306 in association with a particular user 102, the customer registry 314 including the devices 104 (e.g., the devices 104(1)-(4) of FIG. 1) registered to the user 102. In this manner, the remote system 114 maintains a mapping from registered devices 104 to the customer 102.

In some configurations, verbal descriptions of the devices 104, and groups 316 of devices, can be defined by the user 102 and maintained in association with the customer registry 314 of the user 102. For example, the user 102 may have initially provided an indication to the remote system 114 that the device 104(4) is to be named "device D," and/or that a group 316 of devices comprising all of the devices 104(1)-(4) is to be named "Everywhere." Therefore, references to these verbal descriptions (or names) found in a verbal command from the user 102 can be mapped to individual devices 104 and/or to groups 316 indicated in the customer registry 314 as being associated with the user 102. Thus, a user 102 may issue voice commands that reference the predefined names of devices 104 and/or groups 316 that cause the device(s) 104 to perform a requested operation (e.g., output audio of an audio file).

As shown in FIG. 1B, the user 102 can request formation of a group of devices 104 in the environment 106 so that the group can coordinate audio playback in a synchronized manner. As mentioned above, the user 102 can make this request via the GUI 118, or the user 102 can issue a voice command to form a group. For example, a client-side application can be executed on a computing device 122 of the user 102 to request formation of a group of devices 104, such as by toggling soft buttons on the GUI 118 with respect to individual devices 104 that the user 102 wishes to include as members of a group 316. In response to determining that the user 102 has made such a request, an optional group formation module 315, configured to assist in the formation of groups 316, can send a message (e.g., a form_group( ) message) to individual devices 104 in the to-be-formed group, the message informing the device 104 that the device 104 is to attempt to form a group. The group formation module 315 can represent one or more services and/or one or more APIs configured to implement the functions and techniques described herein with reference to the group formation module 315. It is to be appreciated that the discovery module 312 and/or the group formation module 315 shown in FIG. 3 can operate without any dependence on speech processing functionality described herein. For example, the discovery process may not be dependent on a user at all, and group formation may be initiated by a user 102 invoking and providing input to a GUI, such as the GUI 118 shown in FIG. 1B, without providing any speech input to any of the devices 104.

In response to receiving a request from the user 102 to form a group, and in response to the transmission of the form_group ( ) message to individual devices 104 in the to-be-formed group, the devices 104 in the to-be-formed group are thereafter configured to conduct network connectivity testing. An individual device 104 in the to-be-formed group may receive a message from the remote system 114 to initiate such network connectivity testing, or the testing may be initiated locally in the environment 106 by one or more of the devices 104 themselves. Network connectivity testing can be conducted in order to ensure that all of the devices 104 in the to-be-formed group can "see" each other, and that the devices 104 acting in coordination as a group 316 will have suitable network bandwidth to engage in synchronized output of audio by the collective group, and to provide a high-quality audio experience for the users in the environment 106.

Network connectivity testing may be conducted in multiple stages. For instance, a first stage may comprise a "visibility test" (sometimes referred to herein as a "basic connectivity test"). The first stage visibility test can use a request/reply protocol that comprises an individual device 104 of a to-be-formed group sending a message over the LAN of the environment 106 (e.g., via the WAP 117) to individual ones of the other devices 104 of the to-be-formed group using the device identifier 107 (e.g., IP address) information it received from the discovery module 312. If the transmitting device 104 receives a response from a receiving device 104 within a predetermined amount of time (e.g., a couple of seconds), the respective pair of devices 104 is determined to have passed the first stage visibility test. If a response is not received at all, or is not received within the predetermined amount of time, the respective pair of devices 104 is determined to have failed the first stage visibility test. A transmitting device 104 can measure the response time (e.g., total time from request to reply) in any suitable unit of measurement (e.g., milliseconds), and can measure additional information, such as signal strength 128 (e.g., an RSSI value) between the device 104 and the WAP 117 in the environment 106, and the like. Upon completion of the first stage visibility test, an individual device 104 can send the results to the remote system 114, which can then check the results for consistency (e.g., if device A can "talk to" device B, then device B should be able to talk to device A).

It is to be appreciated that the first stage visibility test can be conducted prior to a request from the user 102 to form a group, or it can be received after such a request. For example, the group formation module 315 can instruct the devices 104 in the environment 106 to conduct the first stage visibility test in response to the publishing/sharing of the device identifiers 107 (e.g., IP addresses) amongst the devices 104 in the environment 106, and/or in response to the user 102 invoking a GUI on his/her computing device 122 that will enable the user 102 to form a group of devices 104, yet prior to the user 102 actually requesting to form a particular group of devices 104. In this manner, the system can set the user's 102 expectations up front by informing the user 102 as to whether a desired group can even be formed in the first place. For example, if particular sets of devices 104 in the environment 106 do not pass the first stage visibility test, particular devices 104 can be "greyed out" on the GUI 118 that is presented on the computing device 122 such that the user 102 cannot select particular sets of devices 104 for group formation via the GUI 118 shown in FIG. 1A. Alternatively, an immediate TTS response can be output by a device 104 to inform the user 102 that a desired group cannot be formed due to visibility issues with the desired group of devices 104.

The network connectivity testing may also include a second stage throughput test (sometimes referred to herein as an "audio distribution throughput test," or a "network quality test"). The second stage throughput test is designed to ensure that there is enough network bandwidth between the devices 104 in a to-be-formed group to allow for distribution of audio data that is to be used for synchronized output of audio via the group of devices 104. The second stage throughput test may be conducted in response to a user request, such as a request (made via the GUI 118, or made via a voice user interface (VUI), etc.) to form a group of devices 104. The second stage throughput test may be initiated by the group formation module 315 sending a message to a device 104, or the throughput test may be initiated by a designated test master among the to-be-formed group of devices 104. In either case, a device 104 in the to-be-formed group that is designated as the "test master" coordinates the running of the multi-round throughput test.

This test master can be selected using any suitable algorithm, such as selecting the device 104 having the lowest (or highest) device identifier 107 (e.g., IP address). This algorithm can be executed on each device 104 of the to-be-formed group simultaneously such that an individual device 104 can determine whether it is the test master, or whether a different device 104 is the test master, because each device 104 has obtained each other device's 104 device identifier 107 through the discovery process and can determine which device is the test master, accordingly.

The second stage throughput test orders the devices 104 in a particular throughput test order 126, such as based on assigned scores that are described in more detail below. In some embodiments, the throughput test order 126 can be determined, the first device 104 in the throughput test order 126 (i.e., the device 104 that is assigned the highest score) can be designated as the test master. In any case, the test master runs a first round ("Round 1") of the throughput test by instructing the highest scoring device 104 to act as the audio distribution master, and by designating the remaining devices 104 as slaves. During the first round of the throughput test, an individual slave receives a predetermined amount of data from the first device 104 (i.e., the highest scoring device 104) at substantially the same time. Data throughput can be measured at individual slave devices during the first round of the throughput test, and the data throughput results are sent to a test master, which can be selected as the first device 104 in the ordered list, or as a different device, as described above. Then, either using a prescribed time period, or by selecting a first passing group configuration, latency of the throughput test can be reduced as compared to existing master selection procedures. The selected group configuration will include an audio distribution master device that will provide high quality synchronized audio output via the group of devices 104 by virtue of passing the throughput test while acting as an audio distribution master device. If the throughput test does not result in any passing group configurations, then all group configurations fail the throughput test, and a group cannot be formed with the selected devices 104.

Figure 4:
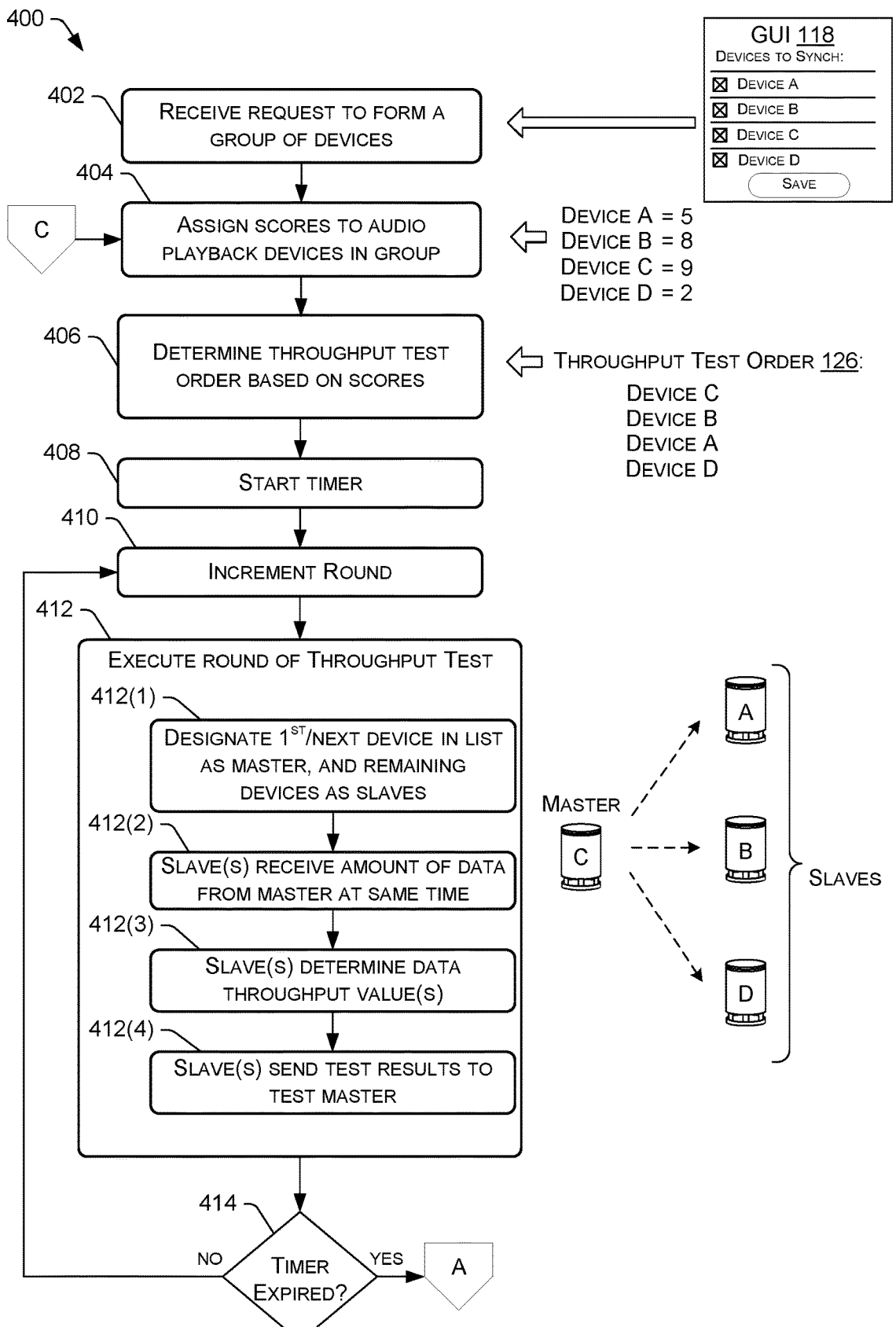
FIG. 4 is a pictorial flow diagram of an illustrative process for conducting a throughput test for a group of audio playback devices that are to comprise a group of devices for synchronized output of audio.

The processes described herein are illustrated as a collection of blocks in a logical flow graph, which represent a sequence of operations that can be implemented in hardware, software, or a combination thereof. In the context of software, the blocks represent computer-executable instructions that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes FIG. 4 is a pictorial flow diagram of an illustrative process 400 for conducting a throughput test for a group of audio playback devices 104 that are to be formed as a group of devices for synchronized output of audio. For discussion purposes, the processes described herein are described with reference to the components of the Figures shown herein.

At 402, a request to form a group of devices 104 can be received based on user input to a computing device. For example, the request at 402 may be received from the computing device 122 of the user 102, such as via a selection on a GUI 118 presented via the computing device 122 to form a group of devices 104. Such a GUI-based request can be transmitted from the computing device 122 over the network 116 where it is received by the remote system 114 at 402. Alternatively, the user 102 may utter a voice command that can be detected at an audio playback device 104 as input audio, and the device 104 may generate audio data, send the audio data to the remote system 114, and the remote system 114—using ASR and NLU processing techniques—can determine that the audio data corresponds to a request from the user 102 to form a group of devices, such as a group comprising all of the user's 102 devices 104 and named the "Everywhere" group. Processing voice commands in this way is described in more detail below. In either case, the request to form the group of devices received at 402 triggers the second stage throughput test, noted above.

At 404, individual scores can be assigned to (or determined for) individual audio playback devices 104 in the to-be-formed group. This can be performed by the group formation module 315 of the remote system 114, by a device(s) 104 in the environment 106, or in part by the remote system 114 and in part by the device(s) 104. The pictorial diagram shown in FIG. 4 illustrates an example where a first score of "5" is assigned to device A (a first audio playback device 104(1)), and a second score of "8" is assigned to device B (a second audio playback device 104(2)), and so on for all of the devices 104 in the to-be formed group. The scores assigned at 404 are generally indicative of a performance level of the respective audio playback devices 104 (or devices A-D) acting as a master device for distributing audio to one or more slave devices in the group. As such, the scoring can be based on any suitable factor(s) or metric(s) that indicates a likely performance level as an audio distribution master device. One example metric that is indicative of a performance level of a device 104 as an audio distribution master is a signal strength 128 value (e.g., an RSSI value) between the device 104 and a WAP 117 in the environment 106. Other factors that can contribute to the scores assigned at 404 include, without limitation, a device type of an individual audio playback device 104, whether the wireless radios of individual devices 104 are currently transmitting or receiving data (e.g., radios having an external wireless device (e.g., a Bluetooth remote control, peripheral device, etc.) attached thereto) at the time of assigning the score at 404, other signal strength indicators (e.g., a signal strength to the remote system 114, a modulation and coding scheme (MCS) level, etc.), and the like. For example, the devices 104 in the environment 106 can be different types of devices with differing wireless transmission/reception capabilities. As such, the remote system 114 can maintain mappings of wireless capabilities or wireless performance levels to device types so that the overall score can be based on, or at least up-weighted or down-weighted according to, the device type of the device 104 in question. In another example, a device 104 with a short range wireless radio (e.g., a Bluetooth radio) can be connected to other wireless devices in the environment, such as the computing device 122 for various reasons. In these situations, the transmission/reception resources of the device's 104 radio can be partially consumed by the other device(s) 122 consuming such resources. Accordingly, a device 104 with an "in-use" wireless radio may not be as suitable for acting as an audio distribution master as another device 104 who's radio is not currently "in-use" in the same way (all else being equal), and the score can be based on this criterion, or at least down-weighted, for the device 104 with the in-use radio. Various other factors and metrics may contribute to the overall score assigned at 404 to a particular device 104, and these examples are not limiting.

At 406, the relative scores are evaluated (e.g., determining that a first score is greater than a second score, and so on) to determine the throughput test order 126. Again, determination of the throughput test order 126 at 406 can be performed by the remote system 114, by a device(s) 104 in the environment 106, or a combination thereof. If the remote system 114 determines the throughput test order 126, the remote system 114 can transmit a message to a device 104 in the to-be-formed group, the message including a list of the devices 104, ordered by the scores assigned at 404 (e.g., in the throughput test order 126). In any case, the first device 104 in the throughput test order 126 can comprise a highest scoring device (in this example, device C, which received a score of 9; the highest amongst the scores in the group). Any suitable device 104 can be selected as the test master, as described herein, and the test master can conduct a throughput test according to the throughput test order 126.

The test master may be the device 104 in charge of collecting the test results from the second stage throughput test, and at 408, the test master can start a timer that is to run for a predetermined time period (e.g., 20 seconds). At 410, for the first iteration of the throughput test, the test master device initiates the first round of the throughput test, and at 412, the first round can be conducted. Conducting an individual round of the throughput test can comprise the subset of operations shown within block 412 of FIG. 4.

At 412(1), for the first iteration of the throughput test, the first device 104 in the list of ranked devices 104 (e.g., device C) can be designated as a first candidate audio distribution mater device. The candidate audio distribution master device is configured to distribute test data to one or more candidate slave devices, and in the case of multiple candidate slaves, test data is distributed to the slaves simultaneously. Also at 412(1), the remaining devices 104 in the ordered list (e.g., devices A, B, and D) can be designated as first candidate slave devices that are to receive the test data from the audio distribution master device.

At 412(2), individual candidate slaves (e.g., devices A, B, and D) receive an amount of the test data from the designated candidate master (e.g., device C) at substantially the same time. For example, the internal clocks of the slave devices can be synchronized, and the individual candidate slaves can start fetching the amount of data from the designated candidate master at the same common time. The test master may initiate this data reception at block 412(2) by sending a command message via the control plane to the individual candidate slave devices, the command message instructing a given candidate slave to begin the throughput test as a slave and to fetch the test data from the designated candidate audio distribution master (e.g., device C) in the first round of the throughput test. The amount of data received at 412(2) by an individual candidate slave is configurable, and can be any amount of data, such as an amount on the order of one megabyte (MB). The test data can be any suitable data, such as sample audio data that is stored in local memory of a device 104, or that is retrieved over the computer network 116 from the content source(s) 119.

At 412(3), the individual candidate slaves determine a data throughput value based on the amount of data the slave receives from the designated master during a period of time. Accordingly, the data throughput value can be measured in any suitable unit of measurement, such as megabits per second (Mbps).

At 412(4), the individual slaves send the measured data throughput value to the test master (e.g., device C), and the first round of the throughput test is complete. Alternatively, data throughput values can be determined by the test master upon receipt of data (e.g., timestamps) from the individual candidate slaves. If the test fails to complete for any given candidate slave device (e.g., a timeout period for the reception of the amount of data expired), the throughput result at the candidate slave in question can be reported as a failure, and a reason for the failure (e.g., timeout) can be specified in a message sent to the test master.

At 414, the test master can make a determination as to whether the predetermined time period has lapsed since starting the timer at 408. If the predetermined time period has not lapsed at 414, the throughput test iterates to the next round by incrementing the round at 410, and proceeding to 412 where the second round of the throughput test can be conducted. In the second round of the throughput test, the next device in the list can be designated as a second candidate audio distribution master at 412(1). In this example, the second device in the list is device B, so device B would be designated as the second candidate audio distribution master in the second round of the throughput test, and the remaining devices (e.g., devices A, C, and D) are designated as second candidate slave devices at 412(1). The test master, upon receipt of all of the test results from the first candidate slave devices in the first round, may send a command message to the next device in the list (e.g., device B), instructing device B to act as the second candidate audio distribution master, and blocks 412(2)-(4) can be carried out thereafter for the second group configuration where device B is the second candidate audio distribution master and the remaining devices (e.g., devices A, C, and D) are the second candidate slave devices.

Figure 5:
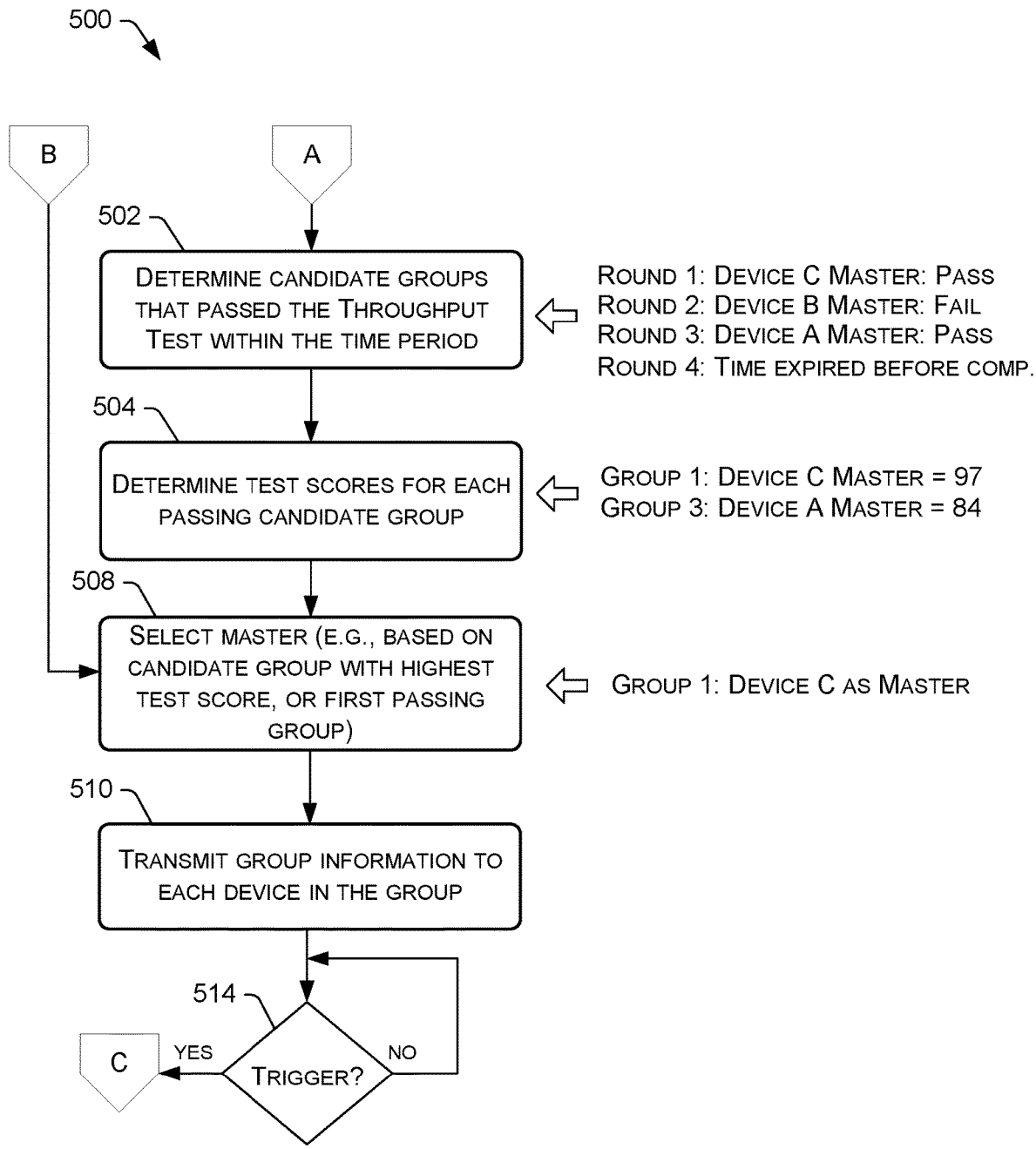
FIG. 5 is a pictorial flow diagram of an illustrative process for selecting, and sending audio data to, a master device for further distribution of the audio data to one or more slaves of a group of devices that are configured to output audio in a synchronized manner.

After completion of an individual round, the test master can check for a lapse of the predetermined time period at 414, and upon expiration of the predetermined time period, the process 400 can proceed to block 502 of the process 500 in FIG. 5, as shown by the off-page reference "A" in FIGS. 4 and 5. Thus, for small groups of devices 104 (e.g., a group of two devices 104), all rounds of the throughput test may be conducted within the predetermined time period. However, for large groups of devices (e.g., a group of ten or more devices 104), the predetermined time period may lapse prior to conducting all of the rounds of the throughput test, which reduces latency of the throughput test as compared to existing approaches that test each and every device 104 as a candidate audio distribution master. It is to be appreciated that the process 400 can be implemented without the score assignment at block 404, and the throughput test order 126 can be determined by another technique, such as based on the device identifiers 107 (e.g., low to high, or high to low, device identifiers 107), or any other suitable ordering scheme.

At 502, test results that were completed within the predetermined time period can be collected by the test master, and candidate group configurations that passed the throughput test within the time period can be determined. Passing the throughput test may be determined by comparing each data throughput value for a given round of the throughput test to a predefined threshold (e.g., a data throughput threshold). For example, looking at the first round of the throughput test, a predefined threshold (e.g., a threshold of 512 kilobits per second (kbps)) may be compared to the individual data throughput values measured by individual slave devices at 412(3) of the process 400. If all of the data throughput values measured during the first round meet or exceed the predefined threshold, Round 1, having a first group configuration designating device C as the candidate audio distribution master, can be determined to have passed the throughput test. Individual rounds of the throughput test that complete within the time period can be evaluated in this manner. The pictorial diagram next to block 502 of FIG. 5 illustrates an example scenario where Rounds 1 and 3 of the throughput test passed, while Round 2 failed, and Round 4 was never completed because the predetermined time period lapsed prior to conducting Round 4.

At 504, an overall throughput test score (e.g., a score from 0-100) can be determined for individual group configurations corresponding to passing rounds of the throughput test. Continuing with the above example, a first group configuration corresponding to Round 1 (or "Group 1") received a throughput test score of 97 based on the test results of the throughput test for Round 1. In Round 1, device C acted as the first candidate audio distribution master. Meanwhile, a second group configuration corresponding to Round 3 (or "Group 3") received a throughput test score of 84 based on the test results of the throughput test for Round 3. In Round 3, device A acted as the third candidate audio distribution master.

At 508, an audio distribution master device can be selected based on the highest throughput test score determined at 504. Continuing with the above example, device C can be selected as the audio distribution master (i.e., the Group 1 configuration) because the Group 1 configuration with device C acting as the candidate audio distribution master received a higher throughput test score than the other passing group configuration (Group 3) with device A acting as the candidate audio distribution master.

At 510, assuming at least one group configuration passes the throughput test (meaning at least one device 104 is capable of acting as a suitable audio distribution master), group information can be transmitted to individual devices 104 in the group, informing the device 104 that it is a part of a group having a particular name (e.g., "Everywhere"), with a membership comprising itself and the other devices 104 in the group. The selection of the audio distribution master at 508 and the transmission of the group information at 510 can be performed locally, such as by the test master selecting the audio distribution master and transmitting the group information to the other devices 104 in the group over the LAN, by the remote system 114 sending a message over the network 116 to the devices 104, or partly by the remote system 114 and partly by a device(s) 104 in the environment 106. In some embodiments, the group 316 can also be persisted in storage 306 of the remote system 114. In some embodiments, a client-side application executed on the computing device 122 can present a "success" or a "failure" indication to the user 102 based on the results of the throughput test, informing the user 102 that a group was successfully formed, or, in the event that none of the rounds passed the throughput test within the prescribed time period, informing the user 102 that the group was not formed successfully.

Once a group (e.g., with the name "Everywhere") is successfully formed, the user 102 can utter a voice command to "play music by Joe Songbird Everywhere". In response to such a voice command, the remote system 114 can send a play music command to a device 104 in the environment 106. This receiving device is sometimes referred to as the "master receiver" and can be selected using any suitable selection algorithm. The master receiver, upon receiving the command, can parse the command to determine that a group 316 identifier corresponding to the Everywhere group is associated with the play music command. In response to identifying the group 316 identifier in the received command, the master receiver can forward the command to the audio distribution master for the group 316, the audio distribution master having been selected at 508, and in the running example, the audio distribution master is device C. The audio distribution master can parse the command for a link (e.g., a uniform resource locator (URL)) to an audio file 513 associated with the play music command, and may retrieve the audio file 513 via the link. The audio distribution master may then distribute the audio file 513 to the slave devices in the Everywhere group 316 for synchronized output of audio content (e.g., sound waves) corresponding to the audio file 513 by the devices 104 in the newly formed Everywhere group (e.g., devices A-D). The audio file 513 can correspond to a song by the artist Joe Songbird, and the audio file 513 can be obtained from the content source 119 directly, or indirectly via the remote system 114, or via the LAN of the environment 106. As will be described below, the remote system 114 can utilize ASR and NLU techniques to determine that the user 102 has requested music from Joe Songbird to playback on a formed group of devices called the "Everywhere" group.

At 514, the remote system 114 may monitor for the occurrence of a trigger event. If a trigger event does not occur at 514, no further throughput tests are conducted and the process 500 iterates by following the "no" route from 514. However, once a trigger event occurs at 514, the process 500 proceeds along the "yes" route from 514 to block 404 of the process 400 in order to re-assign scores to the audio playback devices 104 in the group (e.g., the "Everywhere" group), and to carry out the processes 400 and 500 again, in the manner described above. In this manner, additional throughput tests can be conducted "in the background" after the group has been successfully formed in order to determine if there is a better audio distribution master than the audio distribution master that was selected at 508. For example, as network conditions change, perhaps device C (the originally selected master for the Everywhere group) is no longer the best master, as determined by the processes 400 and 500 in combination.

The trigger evaluated at 514 can include, without limitation, a prescribed time period, an indication that a device 104 in the group has moved to a new location within the environment, an indication that the previously-selected audio distribution master device has lost connectivity, a difference between successive signal strength 128 values for an individual device 104 in the group exceeding a predefined threshold, an indication that a new device 104 registered to the user 102 has come online (e.g., has been powered on), and/or similar trigger events. For instance, a time period can allow for periodically conducting a throughput test in the background at an interval that is of a low enough frequency so as to not consume unnecessary resources, but at a frequency that is likely to catch most instances of changing network conditions. As another example, the devices 104 can include sensors that collect data periodically, and the collected data can be transmitted to the remote system 114 and analyzed to determine whether the device 104 has moved locations within the environment 106. For instance, image data can be collected from cameras on the device 104 and analyzed to determine a changed viewpoint of the device 104, or the like. As another example, the devices 104 can be configured to periodically transmit signal strength 128 values, and the remote system 114 can analyze these signal strength 128 values to determine if signal strength 128 to the WAP 117 has changed beyond a threshold amount for multiple successive measurements associated with a given device 104.

Figure 6:
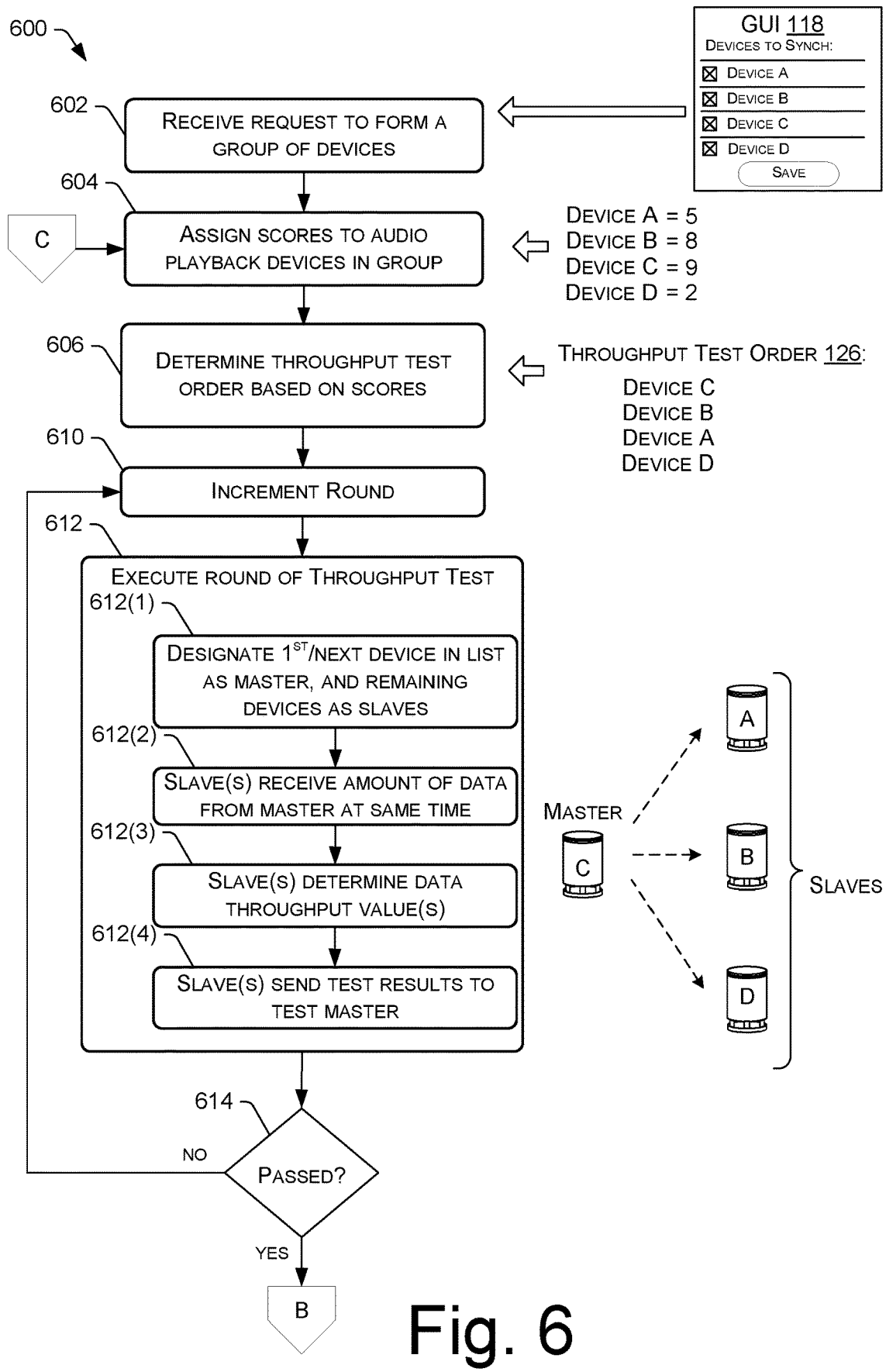
FIG. 6 is a pictorial flow diagram of an illustrative process for conducting a throughput test for a group of audio playback devices that are to comprise a group of devices for synchronized output of audio.

FIG. 6 is a pictorial flow diagram of an illustrative process 600 for conducting a throughput test for a group of audio playback devices 104 that are to be formed as a group of devices 104 for synchronized output of audio. As an alternative to the process 400 of FIG. 4, FIG. 6 illustrates an example technique of selecting a first passing group configuration for designating the audio distribution master of a to-be-formed group, and foregoing any additional rounds of the throughput test if a suitable audio distribution master device is identified based on passing an individual round of the throughput test.

At 602, a request to form a group of devices 104 can be received based on user input to a computing device, in a similar manner to the request described at 402 of the process 400.

At 604, the discovery module 312 of the remote system 114 can assign scores to individual audio playback devices 104 in the to-be-formed group, in a similar manner to the assignment of scores described at 404 of the process 400.

At 606, the relative scores can be evaluated (e.g., by determining that a first score is greater than a second score, and so on) to determine the throughput test order 126. The throughput test order 126 determined at 606 can list the devices 104 in order by the scores assigned at 604.

At 610, for the first iteration of the throughput test, a test master device can be designated, and the test master initiates the first round of the throughput test, and at 612, the first round can be conducted. Conducting an individual round of the throughput test can comprise the subset of operations 612(1)-(4) shown within block 612 of FIG. 6, which are similar to the subset of operations 412(1)-(4) of the process 400 of FIG. 4, and hence will not be described in more detail here.

After completion of the first round of the throughput test at 612, a determination can be made at 614 as to whether the throughput test was passed by the individual round. This determination at 614 can be based on comparing, for the completed round of the throughput test, individual data throughput values measured by individual slaves at block 612(3) to a predefined threshold (e.g., a data throughput threshold) in a similar fashion to that described above at block 502 of the process 500 of FIG. 5. For example, looking at the first round of the throughput test, a predefined threshold (e.g., a threshold of 512 kbps) may be compared to the individual data throughput values measured by individual candidate slave devices at 612(3) of the process 600, and if all of the data throughput values measured during the first round meet or exceed the predefined threshold, Round 1, having a first group configuration with device C designated as the candidate audio distribution master, can be determined to have passed the throughput test at 614. The process 600 can then proceed along the "yes" route from 614 to block 508 of the process 500 of FIG. 5, as shown by the off-page reference "B" in FIGS. 5 and 6, and blocks 508, 510, and 514 of the process 500 can be carried out. That is, the test master can determine (or the test master can send test results to the remote system 114 to determine) that a group configuration designating a device 104 (e.g., device C) as the candidate audio distribution master passed the throughput test. Block 508 can therefore include selecting device C as the audio distribution master for the first group configuration that passed the throughput test.

If it is determined, at 614, that the first group configuration with device C acting as the candidate audio distribution master device does not pass the first round of the throughput test, the process 600 proceeds along the "no" route from 614 to 610 where the throughput test increments to the next round, and proceed to 612 and 614 until a passing group configuration is identified, or until all group configurations have failed. In some configurations, the timer technique described with reference to FIG. 4 can be combined with the technique of FIG. 6. Again, the process 600 can be implemented without the score assignment at block 604, such as by ordering the devices 104 in the throughput test order 126 using a different ordering scheme (e.g., ordering based on device identifiers 107 of the devices 104 in the to-be-formed group).

Figure 7:
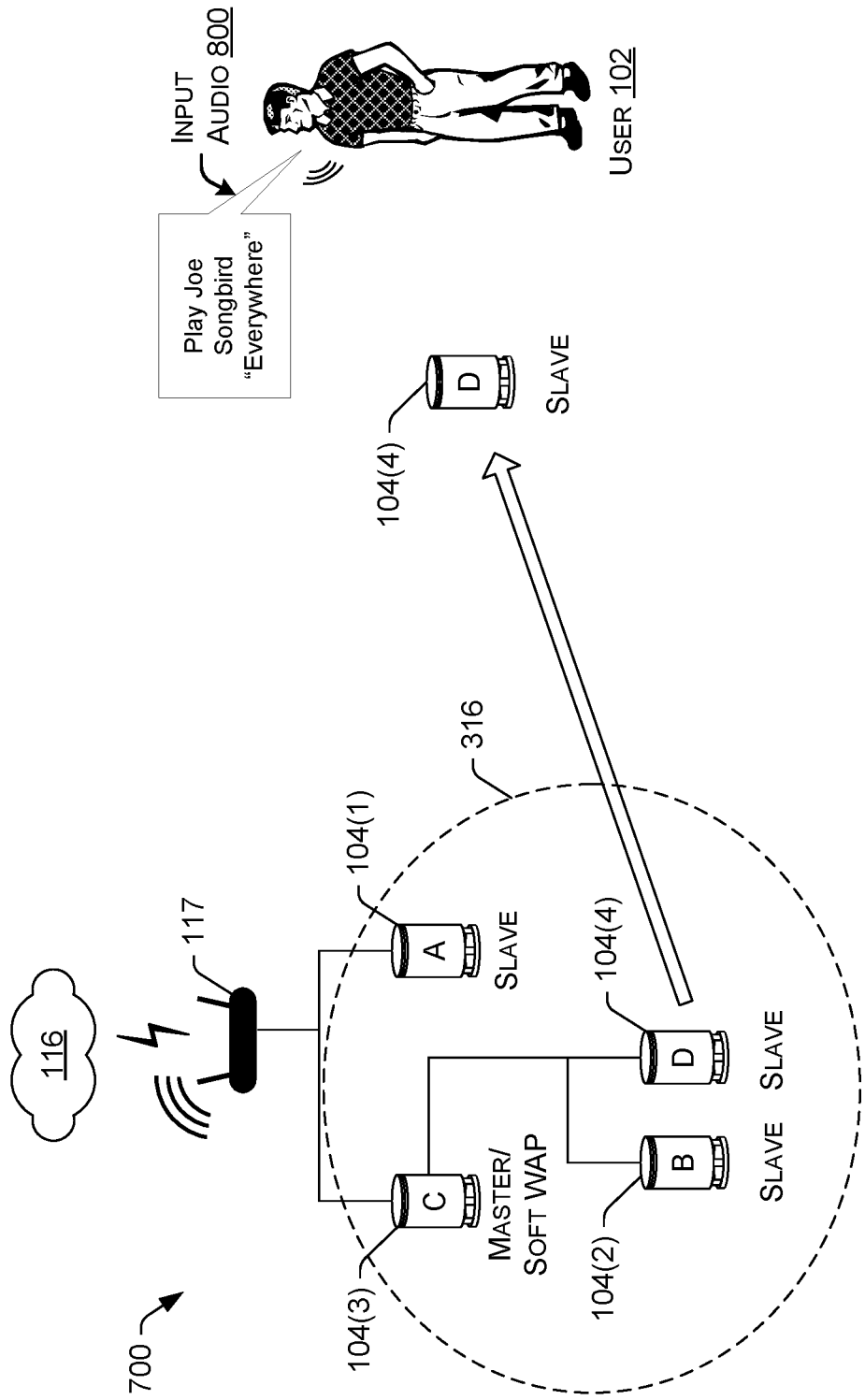
FIG. 7 is a schematic diagram of a hybrid topology for a group of audio playback devices, and an example of a user issuing a voice command to an audio playback device in the group.

FIG. 7 is a schematic diagram of a hybrid topology 700 for a group 316 of audio playback devices 104, and an example of a user 102 issuing a voice command to an audio playback device 104(4) in the group 316. "Hybrid topology," as used herein, means a topology of devices, such as the devices 104 and the local WAP 117, wherein at least one slave device 104 is connected directly to the audio distribution master (e.g., device C in the example of FIG. 7) acting as the soft WAP, and at least one other slave device 104 is connected directly to the local WAP 117. The hybrid topology 700 represents one of multiple possible topologies that audio playback devices 104 can be arranged in for the distribution of audio data in the course of synchronized output of audio by the group 316. It is to be appreciated that the techniques and systems described herein are not limited to using the hybrid topology 700 of FIG. 7, but rather, the hybrid topology 700 is an optional topology in which the devices 104 can be configured. The hybrid topology 700 is used to illustrate the following example technique of a slave device dynamically switching between receiving audio data via a local WAP 117 and via one of the devices 104 in the group 316 acting as a soft WAP. FIG. 7 shows an example where device C (or device 104(3)) has been configured to act as a soft WAP in the hybrid topology 700. As used herein, a "soft WAP" means an audio playback device 104 with dual functionality: (i) functionality for outputting audio, and (ii) functionality for operating as a wireless access point in the environment 106 by sending and receiving messages and/or data (e.g., audio data) to and from one or more of the other devices 104 in the environment 106 directly and without routing the messages and/or data through the local WAP 117 in the environment 106. The soft WAP may also be defined as a different WAP than the local WAP 117 in the environment 106, the soft WAP being usable in lieu of, or in addition to, the local WAP 117 for sending/receiving messages to/from one or more of the devices 104 in the environment 106. A soft WAP may also be temporarily designated as a wireless access point serving one or more of the other devices 104 in the environment 106, or permanently designated as a wireless access point serving the one or more other devices 106. When device C is configured to act as a soft WAP, device C can also be designated as the audio distribution master, and, as shown in FIG. 7, device C can be directly connected to the local WAP 117 in the environment 106. Meanwhile, one or more of the slaves 104 (e.g., devices B and D in FIG. 7) can be connected directly to the audio distribution master, or device C, acting as the soft WAP. The designation of a device 104 in the environment 106 as a soft WAP may be based on any suitable factor or metric, including, for example, a signal strength measurement (e.g., an RSSI value) between the device 104 and the local WAP 117, and/or signal strength measurements between respective pairs of devices 104 in the environment 106.

When the user 102 requests audio playback via the group 316, as shown in FIG. 7, by the user uttering the voice command "Play Joe Songbird Everywhere," the device 104(4) that receives the input audio sends audio data to the remote system 114, which processes the audio data to determine that the user 102 is requesting to play music by the artist Joe Songbird on a group 316 having the name "Everywhere," and the remote system 114 sends a command to a master receiver in the group 316, the command instructing the audio distribution master 104(3) to obtain an audio file corresponding to a song by the artist Joe Songbird from the content source 119. If the master receiver is a different device from the audio distribution master 104(3), the master receiver forwards the command to the audio distribution master 104(3), and the audio distribution master 104(3) obtains the audio file based on a link (e.g., a URL) to audio file maintained by the content source 119 that is specified in the command. Upon receipt of the audio file at device C via the local WAP 117, the audio distribution master (device C), acting as a soft WAP for slave devices B and D, sends the audio file directly to devices B and D using a multicast (UDP) protocol with retransmission. Accordingly, device C, acting as the soft WAP and audio distribution master, transmits, or broadcasts, a multicast packet that contains at least a portion of the audio file at a predetermined data rate. The slave devices B and D, being members of a multicast group, are configured to receive such multicast data packets. If the slave devices B or D don't receive the initially transmitted multicast packet, device C, acting as the soft AP, can retransmit another multicast packet to members of the multicast group. In order to determine successful reception of a multicast packet at a slave device, slaves may "ping" the master after a period of time if no multicast packet is received within the period of time, or may be configured to send an acknowledgement to the soft WAP upon receipt, such that the audio distribution master can retransmit the multicast packet if it does not receive an acknowledgement from all slave devices within a prescribed period of time.

By contrast, FIG. 7 also shows that slave device (e.g., device A) can be directly connected to the local WAP 117, just as device C (or the audio distribution master and soft WAP) can be connected directly to the local WAP 117. In this manner, device C does not act as a soft WAP from the perspective of slave device A, and instead, device C can transmit the audio file to slave device A via the local WAP 117 using a unicast (TCP) protocol. The benefits of using a device 104 as a soft WAP in a pure soft WAP topology, or in a hybrid topology 700, are realized predominantly in larger groups of devices because, instead of transmitting one unicast packet per slave device 104 in a large group, the audio distribution master—acting as the soft WAP—can transmit a single multicast packet to many devices, thereby reducing the bandwidth consumption at the audio distribution master device for synchronized group playback of audio, especially in large groups of devices 104.

That said, there are situations that arise where it is not beneficial for the audio distribution master to act as a soft WAP, such as when many (or all) of the slave devices 104 in the group are switched to audio playback in individual mode. That is, if the user 102, or many users, request audio playback of a different song on each device 104 in its individual capacity, each slave device receives audio data directly from the master device acting as the soft WAP, which is likely to overload the soft WAP, leading to noticeable latency in audio playback, such as jitter in audio playback that is perceptible to the human ear. Switching between group mode and individual mode can be triggered based upon a voice command from a user, such as a first voice command of "Play Joe Songbird Everywhere" followed by a second voice command of "Play Jill Musician on device D." Accordingly, processing of voice commands will be discussed in more detail below.

Referring again to the audio playback device 104 shown in FIG. 2, the device 104 may optionally include a display 212, which may optionally comprise a touch interface 214. Or the device 104 may be "headless" and may primarily rely on spoken commands for input. As a way of indicating to a user 102 that a group has been successfully formed upon a request to form a group, the device 104 may be configured with a visual indicator, such as a light emitting diode (LED) or similar component (not illustrated), that may change color, flash, or otherwise provide visual indications by the device 104. The device 104 may also optionally include input/output device interfaces 208 that connect to a variety of components such as an audio output component such as a speaker 216, a wired headset or a wireless headset (not illustrated) or other component capable of outputting audio. The device 104 may also optionally include an audio capture component. The audio capture component may be, for example, a microphone 218 or array of microphones, a wired headset or a wireless headset (not illustrated), etc. The microphone 218 may be configured to capture audio. If an array of microphones is included, approximate distance to a sound's point of origin may be performed acoustic localization based on time and amplitude differences between sounds captured by different microphones of the array. The device 104 (using microphone 218, an optional wakeword detection module 220, an optional ASR module 250, etc.) may be configured to determine audio data corresponding to detected audio. The device 104 (using input/output device interfaces 208, an optional antenna 222, etc.) may also be configured to transmit the audio data to the remote system 114 for further processing or to process the data using internal components such as a wakeword detection module 220.

For example, via the antenna(s), the input/output device interfaces 208 may connect to network devices of one or more networks 116 via a wireless local area network (WLAN) (such as WiFi) radio, Bluetooth, and/or wireless network radio, such as a radio capable of communication with a wireless communication network such as a Long Term Evolution (LTE) network, WiMAX network, 3G network, etc. A wired connection such as Ethernet may also be supported. Through the network(s) 116, the speech processing system may be distributed across a networked environment.

The device 104 and/or remote computing device 120 may include an ASR module 250. The ASR module 250 in device 104 (which is purely optional and may be omitted from the device 104) may be of limited or extended capabilities. The ASR module 250 may include language models, and an ASR module 250 that performs the automatic speech recognition process. If limited speech recognition is included, the ASR module 250 may be configured to identify a limited number of words, such as keywords detected by the device, whereas extended speech recognition may be configured to recognize a much larger range of words.

The device 104 and/or remote computing device 120 may include a limited or extended NLU module 260. The NLU module 260 in device 104 (which is purely optional and may be omitted from the device 104) may be of limited or extended capabilities. The NLU module 260 may comprising a name entity recognition module, an intent classification module, and/or other components. The NLU module 260 may also include a stored knowledge base and/or entity library, or those storages may be separately located.

Figure 8:
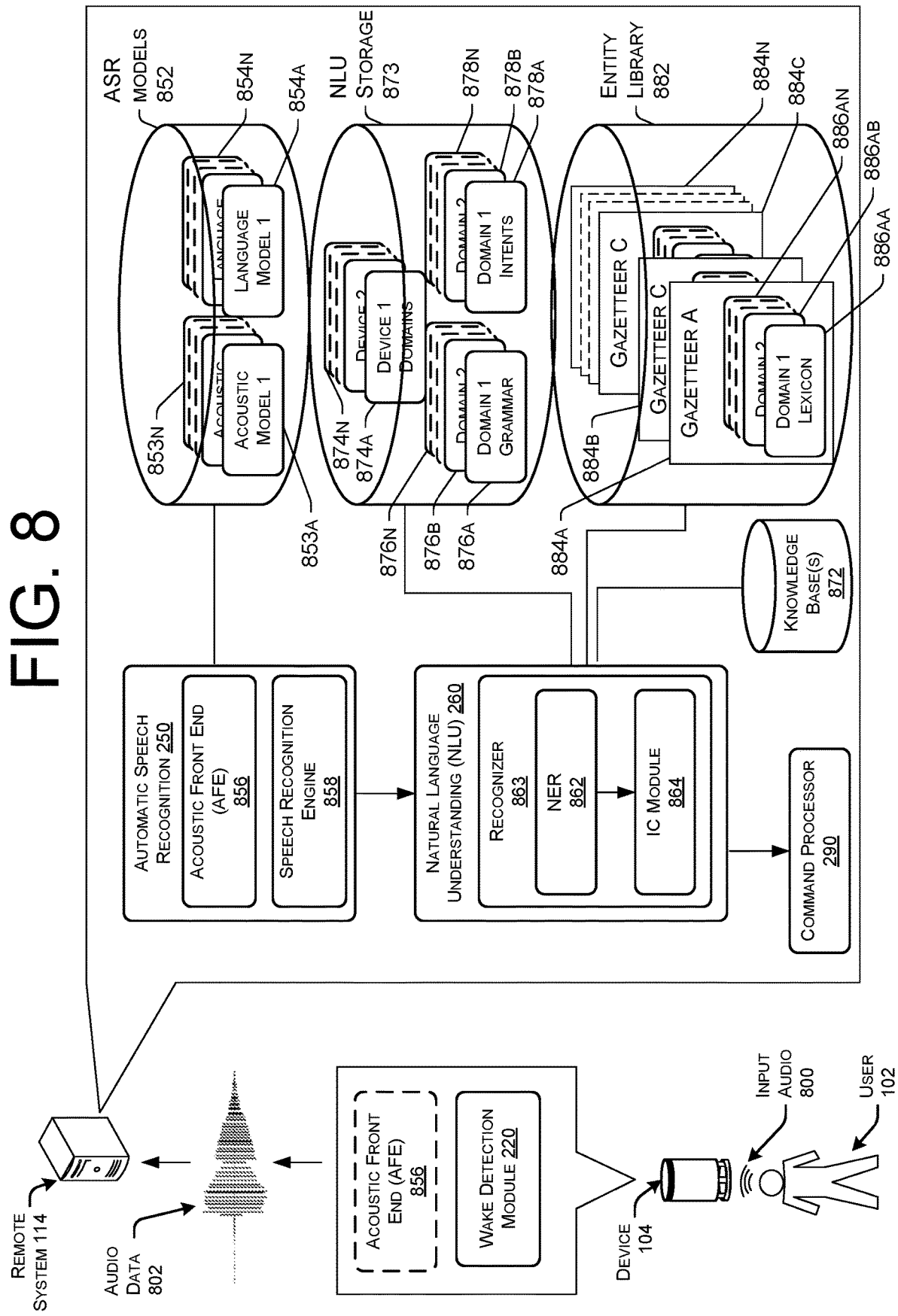
FIG. 8 is a conceptual diagram of components of a speech processing system according to embodiments of the present disclosure.

The device 104 and/or remote computing device 120 may also include an optional command processor 290 that is configured to execute commands/functions associated with a spoken command. Turning with reference now to FIG. 8, illustrated therein is a conceptual diagram of how a spoken utterance can be processed, allowing a system to capture and execute commands spoken by a user, such as spoken commands that may follow a wakeword. The various components illustrated may be located on a same or different physical devices. Communication between various components illustrated in FIG. 8 may occur directly or across a network 116. An audio capture component, such as the microphone 218 of device 104, captures audio 800 corresponding to a spoken utterance. The device 104, using a wakeword detection module 220, then processes the audio 800, or audio data corresponding to the audio 800, to determine if a keyword (such as a wakeword) is detected in the audio 800. Following detection of a wakeword, the device sends audio data 802 corresponding to the utterance (sometimes called "speech data" 802), to a remote system 114 that includes an ASR module 250. The audio data 802 may be output from an optional acoustic front end (AFE) 856 located on the device 104 prior to transmission. Or the audio data 802 may be in a different form for processing by a remote AFE 856, such as the AFE 856 located with the ASR module 250 of the remote system 114.

The wakeword detection module 220 works in conjunction with other components of the device 104, for example a microphone 218 to detect keywords in audio 800. For example, the device 104 may convert audio 800 into audio data, and process the audio data with the wakeword detection module 220 to determine whether speech is detected, and if so, if the audio data comprising speech matches an audio signature and/or model corresponding to a particular keyword.

The device 104 may use various techniques to determine whether audio data includes speech. Some embodiments may apply voice activity detection (VAD) techniques. Such techniques may determine whether speech is present in an audio input based on various quantitative aspects of the audio input, such as the spectral slope between one or more frames of the audio input; the energy levels of the audio input in one or more spectral bands; the signal-to-noise ratios of the audio input in one or more spectral bands; or other quantitative aspects. In other embodiments, the device 104 may implement a limited classifier configured to distinguish speech from background noise. The classifier may be implemented by techniques such as linear classifiers, support vector machines, and decision trees. In still other embodiments, Hidden Markov Model (HMM) or Gaussian Mixture Model (GMM) techniques may be applied to compare the audio input to one or more acoustic models in speech storage, which acoustic models may include models corresponding to speech, noise (such as environmental noise or background noise), or silence. Still other techniques may be used to determine whether speech is present in the audio input.

Once speech is detected in the audio received by the device 104 (or separately from speech detection), the device 104 may use the wakeword detection module 220 to perform wakeword detection to determine when a user intends to speak a command to the device 104. This process may also be referred to as keyword detection, with the wakeword being a specific example of a keyword. Specifically, keyword detection may be performed without performing linguistic analysis, textual analysis or semantic analysis. Instead, incoming audio (or audio data) can be analyzed to determine if specific characteristics of the audio match preconfigured acoustic waveforms, audio signatures, or other data to determine if the incoming audio "matches" stored audio data corresponding to a keyword.

Thus, the wakeword detection module 220 may compare audio data to stored models or data to detect a wakeword. One approach for wakeword detection applies general large vocabulary continuous speech recognition (LVCSR) systems to decode the audio signals, with wakeword searching conducted in the resulting lattices or confusion networks. LVCSR decoding may require relatively high computational resources. Another approach for wakeword spotting builds hidden Markov models (HMM) for each key wakeword word and non-wakeword speech signals respectively. The non-wakeword speech includes other spoken words, background noise etc. There can be one or more HMMs built to model the non-wakeword speech characteristics, which are named filler models. Viterbi decoding can be used to search the best path in the decoding graph, and the decoding output can be further processed to make the decision on keyword presence. This approach can be extended to include discriminative information by incorporating hybrid DNN-HMM decoding framework. In another embodiment the wakeword spotting system may be built on deep neural network (DNN)/recursive neural network (RNN) structures directly, without HMM involved. Such a system may estimate the posteriors of wakewords with context information, either by stacking frames within a context window for DNN, or using RNN. Following-on posterior threshold tuning or smoothing can be applied for decision making. Other techniques for wakeword detection, such as those known in the art, may also be used.

Once the wakeword is detected, the local device 104 may "wake" and begin transmitting audio data 802 corresponding to input audio 800 to the remote system 114 for speech processing. Audio data corresponding to that audio may be sent to remote system 114 for routing to a recipient device or may be sent to the remote system 114 for speech processing for interpretation of the included speech (either for purposes of enabling voice-communications and/or for purposes of executing a command in the speech). The audio data 802 may include data corresponding to the wakeword, or the portion of the audio data corresponding to the wakeword may be removed by the local device 104 prior to sending. Further, a local device 104 may "wake" upon detection of speech/spoken audio above a threshold, as described herein. Upon receipt by the remote system 114, an ASR module 250 may convert the audio data 802 into text. The ASR transcribes audio data into text data representing the words of the speech contained in the audio data 802. The text data may then be used by other components for various purposes, such as executing system commands, inputting data, etc. A spoken utterance in the audio data can be input to a processor configured to perform ASR which then interprets the utterance based on the similarity between the utterance and pre-established language models 854 stored in an ASR model knowledge base (ASR Models Storage 852). For example, the ASR process may compare the input audio data with models for sounds (e.g., subword units or phonemes) and sequences of sounds to identify words that match the sequence of sounds spoken in the utterance of the audio data.

The different ways a spoken utterance may be interpreted (e.g., the different hypotheses) may individually be assigned a probability or a confidence score representing the likelihood that a particular set of words matches those spoken in the utterance. The confidence score may be based on a number of factors including, for example, the similarity of the sound in the utterance to models for language sounds (e.g., an acoustic model 853 stored in an ASR Models Storage 852), and the likelihood that a particular word which matches the sounds would be included in the sentence at the specific location (e.g., using a language or grammar model). Thus individual potential textual interpretations of the spoken utterance (hypothesis) can be associated with corresponding confidence scores. Based on the considered factors and the assigned confidence score, the ASR process 250 outputs the most likely text recognized in the audio data. The ASR process may also output multiple hypotheses in the form of a lattice or an N-best list with individual hypotheses corresponding to confidence scores or other scores (such as probability scores, etc.).

The device or devices performing the ASR processing may include an acoustic front end (AFE) 856 and a speech recognition engine 858. The acoustic front end (AFE) 856 transforms the audio data from the microphone 218 into data for processing by the speech recognition engine 858. The speech recognition engine 858 compares the speech recognition data with acoustic models 853, language models 854, and other data models and information for recognizing the speech conveyed in the audio data. The AFE 856 may reduce noise in the audio data and divide the digitized audio data into frames representing a time intervals for which the AFE 856 determines a number of values, called features, representing the qualities of the audio data, along with a set of those values, called a feature vector, representing the features/qualities of the audio data within the frame. Many different features may be determined, as known in the art, and each feature represents some quality of the audio that may be useful for ASR processing. A number of approaches may be used by the AFE to process the audio data, such as mel-frequency cepstral coefficients (MFCCs), perceptual linear predictive (PLP) techniques, neural network feature vector techniques, linear discriminant analysis, semi-tied covariance matrices, or other approaches known to those of skill in the art.

The speech recognition engine 858 may process the output from the AFE 856 with reference to information stored in speech/model storage (852). Alternatively, post front-end processed data (such as feature vectors) may be received by the device executing ASR processing from another source besides the internal AFE. For example, the device 104 may process audio data into feature vectors (for example using an on-device AFE 856) and transmit that information to a server across a network 116 for ASR processing. Feature vectors may arrive at the remote system 114 encoded, in which case they may be decoded prior to processing by the processor executing the speech recognition engine 858.

The speech recognition engine 858 attempts to match received feature vectors to language phonemes and words as known in the stored acoustic models 853 and language models 854. The speech recognition engine 858 computes recognition scores for the feature vectors based on acoustic information and language information. The acoustic information can be used to calculate an acoustic score representing a likelihood that the intended sound represented by a group of feature vectors matches a language phoneme. The language information can be used to adjust the acoustic score by considering what sounds and/or words are used in context with each other, thereby improving the likelihood that the ASR process will output speech results that make sense grammatically. The specific models used may be general models or may be models corresponding to a particular domain, such as music, banking, etc.

The speech recognition engine 858 may use a number of techniques to match feature vectors to phonemes, for example using Hidden Markov Models (HMMs) to determine probabilities that feature vectors may match phonemes. Sounds received may be represented as paths between states of the HMM and multiple paths may represent multiple possible text matches for the same sound.

Following ASR processing, the ASR results may be sent by the speech recognition engine 858 to other processing components, which may be local to the device performing ASR and/or distributed across the network(s) 116. For example, ASR results in the form of a single textual representation of the speech, an N-best list including multiple hypotheses and respective scores, lattice, etc. may be sent to the remote system 114, for natural language understanding (NLU) processing, such as conversion of the text into commands for execution, either by the device 104, by the remote system 114, or by another device (such as a server running a specific application like a search engine, etc.).

The device performing NLU processing 260 (e.g., server 120) may include various components, including potentially dedicated processor(s), memory, storage, etc. As shown in FIG. 8, an NLU component 260 may include a recognizer 863 that may include a named entity recognition (NER) module 862 which can be used to identify portions of query text that correspond to a named entity that may be recognizable by the system. A downstream process called named entity resolution actually links a text portion to an actual specific entity known to the system. To perform named entity resolution, the system may utilize gazetteer information (884a-884n) stored in entity library storage 882. The gazetteer information may be used for entity resolution, for example matching ASR results with different entities (such as song titles, contact names, etc.) Gazetteers may be linked to users (for example a particular gazetteer may be associated with a specific user's music collection), may be linked to certain domains (such as shopping), or may be organized in a variety of other ways.

Generally, the NLU process takes textual input (such as processed from ASR 250 based on the utterance input audio 800) and attempts to make a semantic interpretation of the text. That is, the NLU process determines the meaning behind the text based on the individual words and then implements that meaning. NLU processing 260 interprets a text string to derive an intent or a desired action from the user as well as the pertinent pieces of information in the text that allow a device (e.g., device 104) to complete that action. For example, if a spoken utterance is processed using ASR 250 and outputs the text "play Joe Songbird Everywhere" the NLU process may determine that the user intended to have a group of devices 104 that are members of a group 316 named "Everywhere" output audio of music by the artist "Joe Songbird" in a synchronized manner.

The NLU may process several textual inputs related to the same utterance. For example, if the ASR 250 outputs N text segments (as part of an N-best list), the NLU may process all N outputs to obtain NLU results.

As will be discussed further below, the NLU process may be configured to parsed and tagged to annotate text as part of NLU processing. For example, for the text "Play Joe Songbird Everywhere," "play" may be tagged as a command (to output audio of an audio file) and "Joe Songbird" and "Everywhere" may be tagged as a specific entities associated with the command. Further, the NLU process may be used to provide answer data in response to queries, for example using the knowledge base 872. For instance, the knowledge base 872 may be used to provide TTS responses via the device 104 as audio output to the user 102 in response to queries like "what's the weather like today?"

To correctly perform NLU processing of speech input, an NLU process 260 may be configured to determine a "domain" of the utterance so as to determine and narrow down which services offered by the endpoint device (e.g., remote system 114 or device 104) may be relevant. For example, an endpoint device may offer services relating to interactions with a telephone service, a contact list service, a calendar/scheduling service, a music player service, etc. Words in a single text query may implicate more than one service, and some services may be functionally linked (e.g., both a telephone service and a calendar service may utilize data from the contact list).

The named entity recognition (NER) module 862 receives a query in the form of ASR results and attempts to identify relevant grammars and lexical information that may be used to construe meaning. To do so, the NLU module 260 may begin by identifying potential domains that may relate to the received query. The NLU storage 873 may include a databases of devices (874a-874n) identifying domains associated with specific devices. For example, the device 104 may be associated with domains for music, telephony, calendaring, contact lists, and device-specific communications, but not video. In addition, the entity library may include database entries about specific services on a specific device, either indexed by Device ID, User ID, or Household ID, or some other indicator.

In NLU processing, a domain may represent a discrete set of activities having a common theme, such as "shopping", "music", "calendaring", etc. As such, individual domains may be associated with particular recognizers 863, language models and/or grammar databases (876a-876n), particular sets of intents/actions (878a-878n), and particular personalized lexicons (886). An individual gazetteer (884a-884n) may include domain-indexed lexical information associated with a particular user and/or device. For example, the Gazetteer A (884a) may include domain-index lexical information 886aa to 886an. A user's music-domain lexical information might include album titles, artist names, and song names, for example, whereas a user's contact-list lexical information might include the names of contacts. Since every user's music collection and contact list is presumably different, this personalized information improves entity resolution.

As noted above, in traditional NLU processing, a query may be processed applying the rules, models, and information applicable to individual identified domains. For example, if a query potentially implicates both communications and music, the query may, substantially in parallel, be NLU processed using the grammar models and lexical information for communications, and will be processed using the grammar models and lexical information for music. The responses based on the query produced by individual sets of models can be scored, with the overall highest ranked result from all applied domains is ordinarily selected to be the correct result.

An intent classification (IC) module 864 parses the query to determine an intent or intents for individual identified domains, where the intent corresponds to the action to be performed that is responsive to the query. An individual domain can be associated with a database (878a-878n) of words linked to intents. For example, a music intent database may link words and phrases such as "quiet," "volume off," and "mute" to a "mute" intent. The IC module 864 identifies potential intents for individual identified domains by comparing words in the query to the words and phrases in the intents database 878. Traditionally, the determination of an intent by the IC module 864 is performed using a set of rules or templates that are processed against the incoming text to identify a matching intent.

In order to generate a particular interpreted response, the NER 862 applies the grammar models and lexical information associated with the respective domain to actually recognize a mention one or more entities in the text of the query. In this manner the NER 862 identifies "slots" (e.g., particular words in query text) that may be needed for later command processing. Depending on the complexity of the NER 862, it may also label each slot with a type of varying levels of specificity (such as noun, place, city, artist name, song name, or the like). An individual grammar model 876 may include the names of entities (i.e., nouns) commonly found in speech about the particular domain (i.e., generic terms), whereas the lexical information 886 from the gazetteer 884 can be personalized to the user(s) and/or the device. For instance, a grammar model associated with the shopping domain may include a database of words commonly used when people discuss shopping.

The intents identified by the IC module 864 are linked to domain-specific grammar frameworks (included in 876) with "slots" or "fields" to be filled. Each slot/field corresponds to a portion of the query text that the system believes corresponds to an entity. For example, if "play music" is an identified intent, a grammar (876) framework or frameworks may correspond to sentence structures such as "Play {Artist Name}," "Play {Album Name}," "Play {Song name}," "Play {Song name} by {Artist Name}," etc. However, to make resolution more flexible, these frameworks would ordinarily not be structured as sentences, but rather based on associating slots with grammatical tags.

For example, the NER module 862 may parse the query to identify words as subject, object, verb, preposition, etc., based on grammar rules and/or models, prior to recognizing named entities. The identified verb may be used by the IC module 864 to identify intent, which can then be used by the NER module 862 to identify frameworks. A framework for an intent of "play" may specify a list of slots/fields applicable to play the identified "object" and any object modifier (e.g., a prepositional phrase), such as {Artist Name}, {Album Name}, {Song name}, etc. The NER module 862 then searches the corresponding fields in the domain-specific and personalized lexicon(s), attempting to match words and phrases in the query tagged as a grammatical object or object modifier with those identified in the database(s).

This process includes semantic tagging, which is the labeling of a word or combination of words according to their type/semantic meaning. Parsing may be performed using heuristic grammar rules, or an NER model may be constructed using techniques such as hidden Markov models, maximum entropy models, log linear models, conditional random fields (CRF), and the like.

For instance, a query of "play Song 1 by the Joe Songbird" might be parsed and tagged as {Verb}: "Play," {Object}: "Song 1," {Object Preposition}: "by," and {Object Modifier}: "Joe Songbird." At this point in the process, "Play" is identified as a verb based on a word database associated with the music domain, which the IC module 864 will determine corresponds to the "play music" intent. At this stage, no determination has been made as to the meaning of "Song 1" and "Joe Songbird," but based on grammar rules and models, it can be determined that the text of these phrases relate to the grammatical object (e.g., entity) of the query.

The frameworks linked to the intent are then used to determine what database fields should be searched to determine the meaning of these phrases, such as searching a user's gazette for similarity with the framework slots. So a framework for "play music intent" might indicate to attempt to resolve the identified object based {Artist Name}, {Album Name}, and {Song name}, and another framework for the same intent might indicate to attempt to resolve the object modifier based on {Artist Name}, and resolve the object based on {Album Name} and {Song Name} linked to the identified {Artist Name}. If the search of the gazetteer does not resolve the slot/field using gazetteer information, the NER module 862 may search the database of generic words associated with the domain (in the knowledge base 872). So for instance, if the query was "play songs by Joe Songbird," after failing to determine an album name or song name called "songs" by "Joe Songbird," the NER component 862 may search the domain vocabulary for the word "songs." In the alternative, generic words may be checked before the gazetteer information, or both may be tried, potentially producing two different results.

The results of NLU processing may be tagged to attribute meaning to the query. So, for instance, "play Song 1 by Joe Songbird" might produce a result of: {domain} Music, {intent} Play Music, {artist name} "Joe Songbird," {media type} SONG, and {song title} "Song 1." As another example, "play songs by Joe Songbird" might produce: {domain} Music, {intent} Play Music, {artist name} "Joe Songbird," and {media type} SONG.

The output data from the NLU processing (which may include tagged text, commands, etc.) may then be sent to a command processor 290. The destination command processor 290 may be determined based on the NLU output. For example, if the NLU output includes a command to play music, the destination command processor 290 may be a music playing application, such as one located on device 104 or in a music playing appliance, configured to execute a music playing command. If the NLU output includes a search request, the destination command processor 290 may include a search engine processor, such as one located on a search server, configured to execute a search command.

The NLU operations of existing systems may take the form of a multi-domain architecture. Each domain (which may include a set of intents and entity slots that define a larger concept such as music, books etc. as well as components such as trained models, etc. used to perform various NLU operations such as NER, IC, or the like) may be constructed separately and made available to an NLU component 260 during runtime operations where NLU operations are performed on text (such as text output from an ASR component 250). An individual domain may have specially configured components to perform various steps of the NLU operations.

For example, in a NLU system, the system may include a multi-domain architecture consisting of multiple domains for intents/commands executable by the system (or by other devices connected to the system), such as music, video, books, and information. The system may include a plurality of domain recognizers, where an individual domain may include its own recognizer 863. An individual recognizer may include various NLU components such as an NER component 862, IC module 864 and other components such as an entity resolver, or other components.

For example, a music domain recognizer 863-A (Domain A) may have an NER component 862-A that identifies what slots (e.g., portions of input text) may correspond to particular words relevant to that domain. The words may correspond to entities such as (for the music domain) a performer, album name, song name, etc. An NER component 862 may use a machine learning model, such as a domain specific conditional random field (CRF) to both identify the portions corresponding to an entity as well as identify what type of entity corresponds to the text portion. For example, for the text "play songs by Joe Songbird," an NER 862-A trained for a music domain may recognize the portion of text [Joe Songbird] corresponds to an entity and an artist name. The music domain recognizer 863-A may also have its own intent classification (IC) component 864-A that can determine the intent of the text assuming that the text is within the proscribed domain. An IC component may use a model, such as a domain specific maximum entropy classifier to identify the intent of the text, where the intent is the action the user desires the system to perform. For this purpose, the remote system computing device 120 may include a model training component 370. The model training component may be used to train the classifier(s)/machine learning models discussed above.

As noted above, multiple devices may be employed in a single speech processing system. In such a multi-device system, individual ones of the devices may include different components for performing different aspects of the speech processing. The multiple devices may include overlapping components. The components of the devices 104 and remote device 120, as illustrated in FIGS. 2, 3, and 8, are exemplary, and may be located in a stand-alone device or may be included, in whole or in part, as a component of a larger device or system, may be distributed across a network or multiple devices connected by a network, etc.

Figure 9:
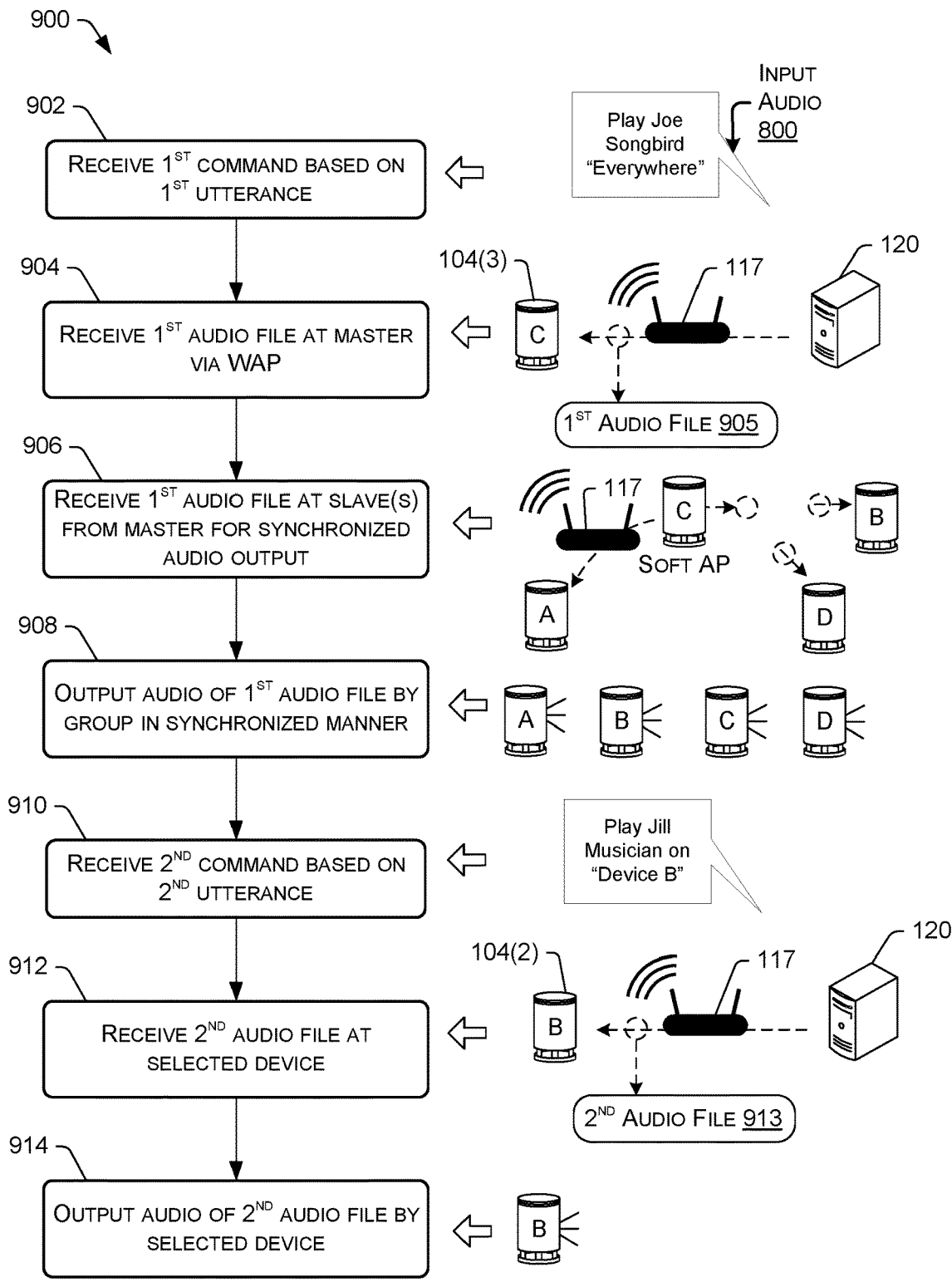
FIG. 9 is a pictorial flow diagram of an illustrative process for dynamically switching between a soft wireless access point (WAP) and a WAP in a hybrid topology based on a command to operate in group mode or individual mode for audio playback.

FIG. 9 is a pictorial flow diagram of an illustrative process 900 for dynamically switching between a soft WAP and a WAP in a hybrid topology 700 based on a command to operate in group mode or individual mode for audio playback.

At 902, a first command can be received by an audio playback device 104 based at least in part on a first utterance in the environment 106. For example, the user 102 may utter the voice command "Play Joe Songbird Everywhere", and the microphone 218 of device D, may generate audio data 802 based on the input audio 800 corresponding to the utterance, and may transmit the audio data 802 to the remote system 114 for processing the voice command. The remote system 114 can perform the various ASR and NLU techniques described above to generate the first command by the command processor 290, which may be specific to a music domain or service. The components of the remote system 114 involved with processing the speech from the user 102 and generating the first command may be unaware of the intended target of the command. For example, the intended target on which the user 102 would like to play music from in the above example is the group 316 called "Everywhere." Accordingly, the ASR and NLU components of the remote system 114 may process the audio 800 to determine that Everywhere corresponds to a target for output of audio data, but these components may not know whether "Everywhere" corresponds to a single device 104 or multiple devices 104 (e.g., a group 316). A component of the remote system 114 in charge of routing the first command to the devices 104 via the network 116 may reference the customer registry 314 to determine, from the group 316 identifiers that "Everywhere" corresponds to a group 316 comprising multiple devices 104. This routing component, having determined the devices 104 that are members of the "Everywhere" group 316, can then select a master receiver device 104 that is to receive the first commend at 902. Thus, the first command can be received by a device 104 that corresponds to the master receiver at block 902.

The master receiver may be a different device 104 than the audio distribution master device (e.g., device C in the above example). In this scenario, the master receiver forwards the command to the audio distribution master, the first command instructing the audio distribution master to obtain an audio file associated with the artist "Joe Songbird" for initiating synchronized audio playback of the audio file via the group named "Everywhere." In some embodiments, the first command may include an audio playback operation, a first content identifier corresponding to a song by the artist Joe Songbird, and a target identifier associated with the Everywhere group comprising devices A-D. The master receiver may forward the command to the audio distribution master based on the presence of the target identifier associated with the Everywhere group in the command. The target identifier informs the master receiver that the devices in the Everywhere group are to be placed in "group mode" for playback of audio in a synchronized manner via the Everywhere group.

Device C, being the audio distribution master device of the "Everywhere" group, receives the command (either directly from the remote system 114 at block 902 when it is the master receiver, or otherwise forwarded from the master receiver). The command may instruct the audio distribution master to retrieve a first audio file 905 from a content source. At 904, the audio distribution master receives (e.g., by following the link in the first command) a first audio file 905 from the content source 119 and via the WAP 117 in the environment 106. The audio file 905 corresponds to the content identifier in the first command. The first content identifier in the first command may be a link (e.g., a Uniform Resource Locator (URL)) pointing to the content source 119 where the audio file 905 is to be obtained, and the audio distribution master device 104 may use the link to retrieve the audio file 905.

At 906, one or more slaves in the group of devices that are to engage in synchronized audio playback of the audio file 905 receive the first audio file 905 from the audio distribution master device (e.g., device C). As shown in the pictorial diagram next to block 906 of FIG. 9, utilization of a hybrid topology, such as the hybrid topology 700 shown in FIG. 7, may cause individual slaves to receive the first audio file 905 from the audio distribution master (e.g., device C) via the WAP 117. This is the case with the slave device A, which is connected to device C (the audio distribution master device) via the WAP 117 in the environment 106. For individual slave devices, such as slave devices B and D, which are directly connected to the audio distribution master (e.g., device C) acting as a soft WAP, those slave devices B and D receive the first audio file 905 directly from the audio distribution master device in the form of a multicast packet, which is not transmitted via the WAP 117.

At 908, the devices 104 in the "Everywhere" group, which now possess the first audio file 905, can output audio of the first audio file 905 in a synchronized manner. Before continuing with the remaining blocks of the process 900, a brief description of synchronized output of audio, such as that which can take place at block 908, is described.

In general, the audio playback devices 104 described herein are configured to output audio in a synchronized manner; "synchronized" meaning substantially synchronized in the sense that audio output between two audio playback devices 104 cannot be out of synch by more than a threshold amount of drift (due to respective local clocks running at different frequencies) that is known to be perceptible to the human ear. When devices 104 are situated in different rooms of a house, a threshold drift of about 5000 microseconds or greater may be perceptible to the human ear, while a threshold drift of 150 microseconds or greater may be perceptible to the human ear when at least two devices 104 are situated in the same room. Thus, synchronized output of audio, as used herein, can mean substantially synchronized in the sense that audio of the same audio file can start playback at respective devices 104 at substantially the same time (e.g., within milliseconds or microseconds of each other), and the relative time offsets between the devices' 104 local clocks can drift over the course of audio playback up to a predetermined amount in order to be considered as maintaining "synchronicity". By maintaining synchronicity in this manner, an echo effect due to slight deviations in timing between respective devices 104 can be minimized, and often eliminated.

Synchronized output of audio begins with audio distribution. For instance, all of the devices 104 in a group 316 can receive the same audio file. A streaming protocol can be implemented that allows an audio distribution master device to send messages to slave devices instructing the slaves to "play this audio file at this time." The audio distribution master device can be responsible for coordinating audio distribution from the content source(s) 119 to the slave devices 104.

Referring back to FIG. 2, the audio playback device 104 may optionally include an audio pipeline 255 and an optional time synch module 265. The audio pipeline 255 can comprise a media player configured to receive audio data (e.g., audio files) from the content source(s) 119 via the remote system 114, and to decode an incoming audio stream. The audio pipeline 255 can further include a mixer that creates a single audio stream from mixed audio, such as a TTS response mixed with a music audio file, and an output path providing audio output processing, such as EQ, and the like.

The time synch module 265 is configured to synchronize time between the device 104 and one or more other devices 104 in a group 316. The time synch protocol may run separate from the rest of the audio system, and keeps the audio pipeline 255 clocks of all grouped devices 104 in sync. One device 104 can act as a time master (typically a different device as the audio distribution master). The time master exchanges timestamp information with slaves so that all slave devices can calculate and correct the time differences (Skew, drift=dSkew/dt) between themselves and the time master. Time synchronization establishes a common time base between the master device and the slaves. The devices 104 have their own crystal oscillators that run at slightly different frequencies. For example, the crystals on respective devices 104 can be off by 20 PPM slow or fast (e.g., 20 µs per second). Two devices can therefore differ by up to 40 PPM. If this 40 PPM is not corrected, the phase coherence between speakers will be off by more than 150 µs in only 4 seconds, and will be off by more than 5 ms in about 2 minutes.

Therefore, the relative offset between clocks (skew) and the relative change in skew over time (drift) can be measured and use to resample audio rates to match the master device's audio playback rate, thereby correcting the differences between respective device 104 clocks. A timestamp exchange technique can be used for measuring skew and drift across clocks of different audio playback devices 104. The time master device can take a first timestamp and send it to a slave device, and in response to the first timestamp's arrival at the slave device, the slave device can take a second timestamp and send it to the time master device. In response to the second timestamp arriving at the time master device, the time master can take a third timestamp. Other methods can also be used, such as user datagram protocol (UDP) broadcast techniques where timestamps are taken on both the time master (outgoing) side and the slave (incoming) side, while also attempting to minimize the time-in-flight from master to slave. Another possible technique is to use a high-resolution timing register in Wi-Fi beacon packet to synchronize devices (e.g., synchronizing to the WAP's 117 Wi-Fi beacon, or synchronizing to the designated soft WAP's Wi-Fi beacon while the soft WAP (i.e., master device) syncs to one slave device using the above-mentioned timestamp exchange technique, etc.).

Synchronized output of audio also involves audio placement, where each device 104 determines a length of time that an audio file will be processed through the audio pipeline 255 before it is actually output as audio via the speaker 216. This is because one device 104 may process audio data through its local audio pipeline 255 in a different amount of time than the next device 104. Thus, by determining this length of time, the device 104 can determine when an audio file is to be pushed to the beginning of the audio pipeline 255 so that the audio corresponding to the audio file will be output at substantially the same time as the output of audio on the other device(s) 104 in the group 316. "Substantially the same time" here means output of audio from multiple devices 104 in the group begins within a particular time period, such as 5 ms.

Continuing with reference again to FIG. 9, at block 910, a second command can be received by an audio playback device 104 (e.g., device D) based at least in part on a first utterance in the environment 106. For example, the user 102 may utter the voice command "Play Jill Musician on Device B", and the microphone 218 of device D, may generate audio data 802 based on the input audio 800 corresponding to the utterance, and may transmit the audio data 802 to the remote system 114 for processing the voice command. The remote system 114 can perform the various ASR and NLU techniques described above to generate the second command by the command processor 290, which may be specific to a music domain or service, and the second command can be received by a device 104. The second command may be received by a master receiver. If the master receiver is different than the target device specified in the voice command (e.g., device B in the above example), the master receiver can forward the command to the specified target device 104. The second command may instruct device B (the target device) to obtain an audio file associated with the artist "Jill Musician" for initiating synchronized audio playback of the audio file via the device B in individual mode. In some embodiments, the second command may include an audio playback operation, a second content identifier corresponding to a song by the artist Jill Musician, and a target identifier associated with the entity specified in the user's 102 voice command (e.g., device B in the above example). This tells the master receiver and the target device (e.g., device B) that device B should be placed into "individual mode" for playback of audio by device B in isolation.

At 912, device B, being the target device on which the audio file is to be output, receives a second audio file 913 that was ultimately obtained from the content source 119 via received via the WAP 117 in the environment 106. The audio file 913 corresponds to the content identifier in the second command. The second content identifier in the second command may be a link (e.g., a URL) pointing to the content source 119 where the audio file 913 is to be obtained, and the target device B may use the link to retrieve the audio file 913.

At 914, audio of the second audio file 913 can be output by the target device B. Notably, although device B, while in group mode, is configured to receive audio data directly from the audio distribution master acting as a soft WAP, device B is nonetheless instructed by the second command received at 910 to operate in individual mode and to dynamically switch from receiving audio data directly from the master device, to receiving audio data via the WAP 117 in the environment. By contrast, if device B were to remain in the "soft WAP" configuration where it receives audio data directly from the audio distribution master device, the audio distribution master would have to retrieve the second audio file 913 and send the audio file 913 directly to the slave device B for output of audio on the device B. This is inefficient from a networking bandwidth standpoint, especially considering a possible scenario where many slave devices 104 in a group are switched to individual mode and all of them are trying to access audio data directly from the audio distribution master acting as the soft WAP. Instead, the process 900 allows these slave devices 104 to dynamically switch to receiving audio data via the WAP 117 in the environment when they are to operate in individual mode, having previously operated in group mode.

Figure 10:
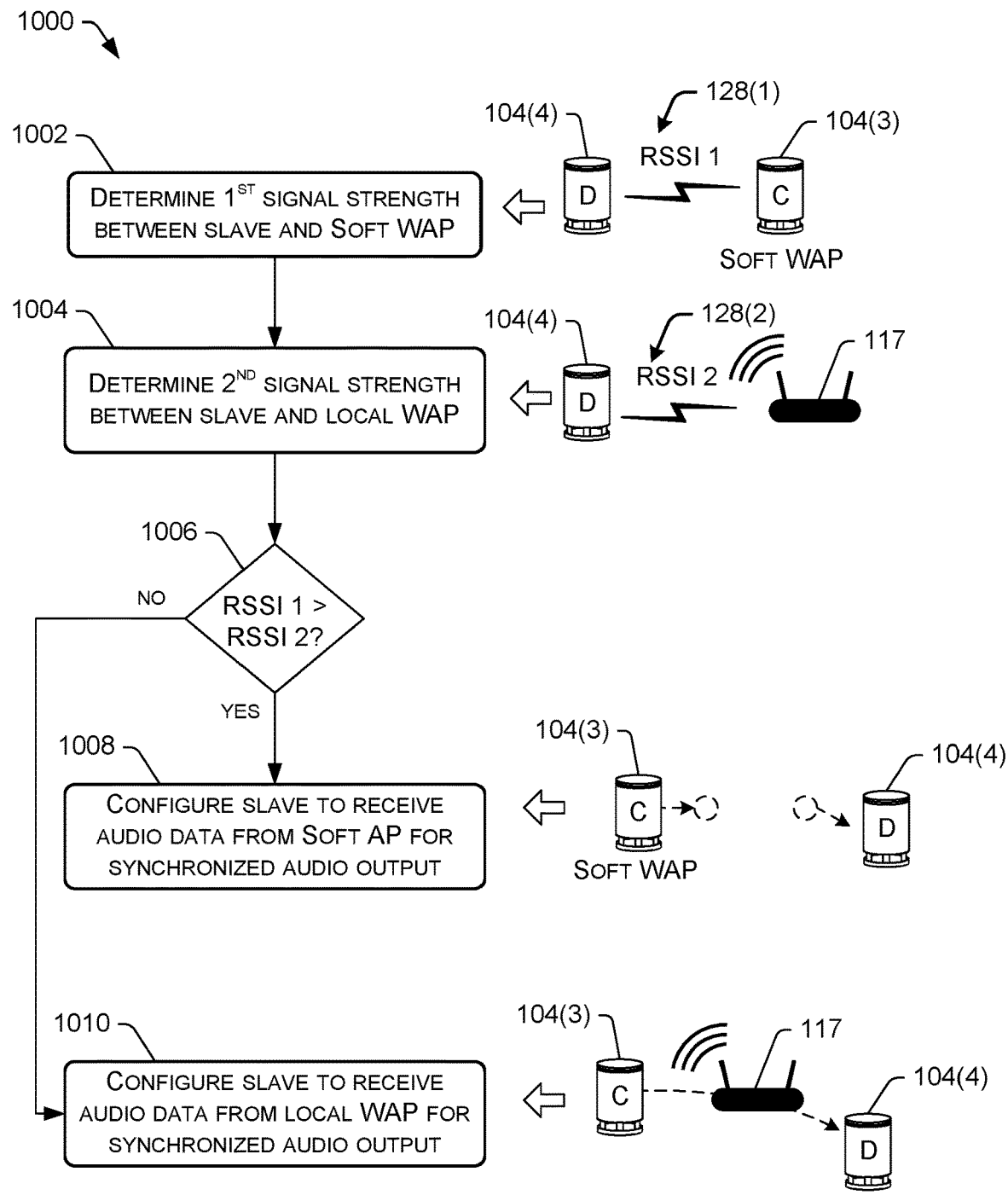
FIG. 10 is a pictorial flow diagram of an illustrative process for configuring a slave device to receive audio data from a master device via a soft WAP or a WAP in a hybrid topology or a soft WAP topology, depending on respective signal strength measurements between the slave device and the soft WAP, and between the slave device and the WAP.

FIG. 10 is a pictorial flow diagram of an illustrative process 1000 for configuring a slave device to access audio data from a master device via a soft WAP or a WAP in a hybrid topology, depending on respective signal strength values as measured between the soft WAP and the WAP.

At 1002, a slave device, such as the slave device D (or device 104(4)), may determine a first signal strength 128(1) value (e.g., a first RSSI value) between the slave device 104(4) and another audio playback device 104(3) (e.g., device C) acting as the soft WAP in a hybrid topology 700.

At 1004, the slave device (e.g., device D 104(4)) may determine a second signal strength 128(2) value (e.g., a second RSSI value) between the slave device 104(4) and the local WAP 117 in the environment 106.

At 1006, a determination can be made as to whether the first signal strength 128(1) value is greater than the second signal strength 128(2) value (or greater than the second signal strength 128(2) value by more than a threshold amount). This determination at 1006 may be made by the slave device 104(4) itself, or by another device, such as a computing device 120 of the remote system 114 after the signal strength values 128(1)/(2) are sent to the remote system 114 for comparison.

If it is determined at 1006 that the first signal strength 128(1) value is greater than the second signal strength 128(2) value, the process 1000 follows the "yes" route from 1006 to 1008 where the slave device 104(4) (or device D) is configured to receive audio data from the audio playback device 104(3) (e.g., device C) acting as the soft WAP. For example, the slave device 104(4) can be configured to receive an audio file from the audio distribution master device 104(3) acting as the soft WAP in a hybrid topology 700 by receiving one or more multicast packets containing at least a portion of the audio file, without routing the audio file through the WAP 117 as it is transmitted from the audio distribution master device 104(3) to the slave device 104(4).

If it is determined at 1006 that the second signal strength 128(2) value is greater than the first signal strength 128(1)

value, then the process follows the "no" route from 1006 to 1010, where the slave device 104(4) (or device D) is configured to receive audio data from the audio distribution master device 104(3) (e.g., device C) via the WAP 117 in the environment 106. For example, the slave device 104(4) can be configured to receive an audio file from the audio distribution master device 104(3) in a hybrid topology 700 by receiving, via the WAP 117, one or more unicast packets containing at least a portion of the audio file. In the event that the signal strength values 128(1) and 128(2) are determined to be equal at 1006, a default configuration between 1008 and 1010 may be chosen, such as a default to receiving audio data from the audio distribution master device 104(3) acting as the soft WAP at block 1008. Accordingly, the process 1000 allows the slave devices 104 within a group 316 of devices 104 to configure themselves to communicate directly with the audio distribution master device 104 acting as the soft WAP when there is a better signal strength 128 between the slave and the soft WAP as compared to the signal strength between the slave and the local WAP 117, and vice versa.

Figure 11:
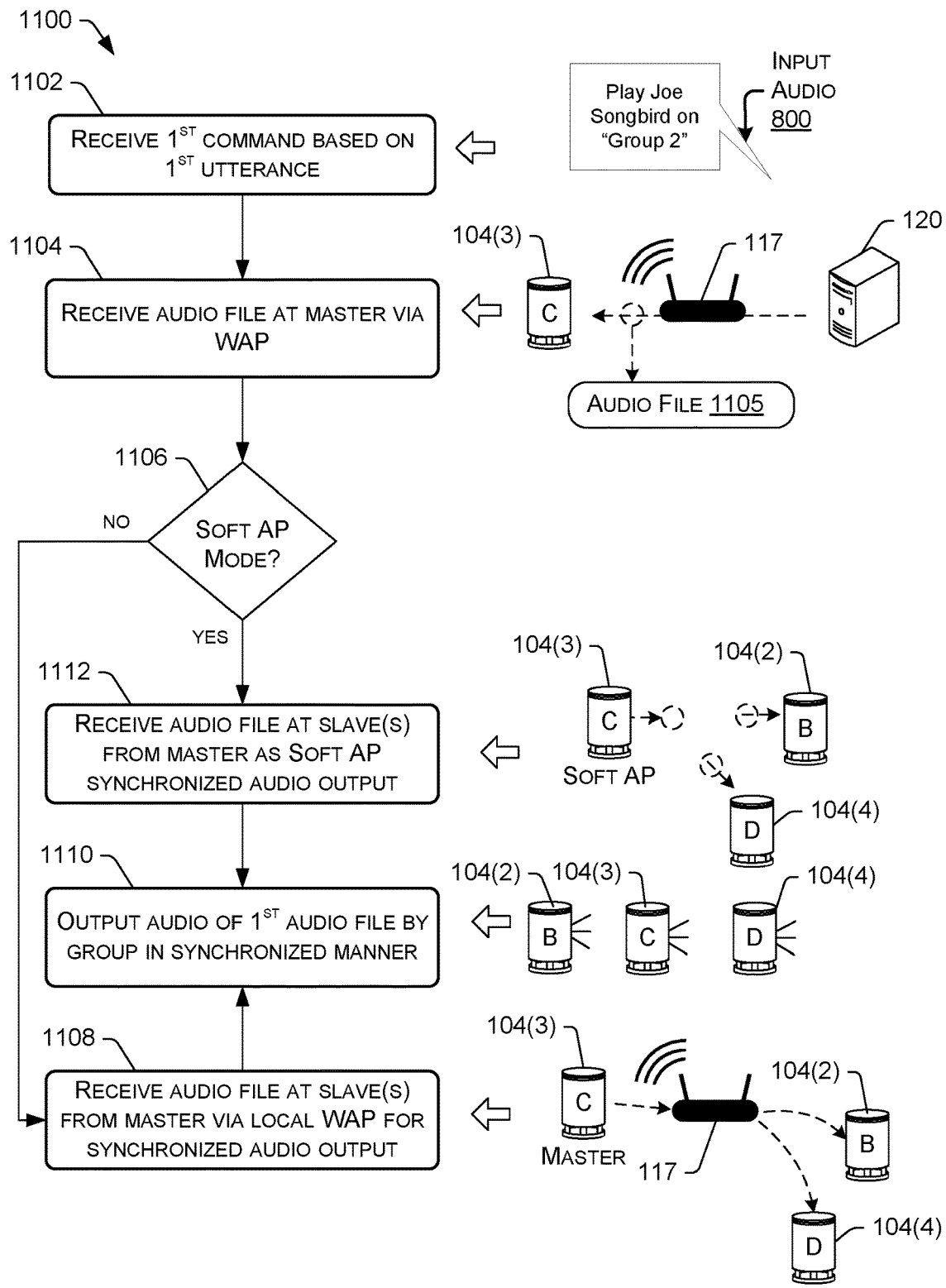
FIG. 11 is a pictorial flow diagram of an illustrative process for configuring a slave device to receive audio data from a master device via a soft WAP or a WAP in a hybrid topology.

FIG. 11 is a pictorial flow diagram of an illustrative process 1100 for configuring a slave device to access audio data from a master device via a soft WAP or a WAP in a hybrid topology.

At 1102, a first command can be received by an audio playback device 104 based at least in part on a first utterance in the environment 106. In the example process 1100, the environment 106 can comprise a physical structure with multiple rooms, such as the house shown in FIG. 1, where device D is located in the living room 112. Thus, in the example of FIG. 11, the user 102 may utter the voice command "Play Joe Songbird on Group 2", and the microphone 218 of device D, may generate audio data 802 based on the input audio 800 corresponding to the utterance, and may transmit the audio data 802 to the remote system 114 for processing the voice command. The remote system 114 can perform the various ASR and NLU techniques described above to generate the first command by the command processor 290, which may be specific to a music domain or service, and the first command can be received by a device 104. The first command may be received by a master receiver, and when the master receiver is different than the audio distribution master device (e.g., device C in the above example), the first command may be forwarded to the audio distribution master device, the first command instructing the audio distribution master to obtain an audio file associated with the artist "Joe Songbird" for initiating synchronized audio playback of the audio file via the group named "Group 2." Let's say Group 2 comprises the devices B, C, and D shown in the environment 106 of FIGS. 1A and 1B. In some embodiments, the first command may include an audio playback operation, a first content identifier corresponding to a song by the artist Joe Songbird, and a target identifier associated with Group 2 comprising devices B-D. This tells the master receiver and the audio distribution master that the devices in Group 2 are to be placed in "group mode" for playback of audio in a synchronized manner via the Group 2.

At 1104, device C, being the audio distribution master device of Group 2, receives a first audio file 1105 that was ultimately obtained from the content source 119 and received via the WAP 117 in the environment 106. The audio file 1105 corresponds to the content identifier in the first command. The first content identifier in the first command may be a link (e.g., a URL) pointing to the content source 119 where the audio file 1105 is to be obtained, and the audio distribution master device 104 may use the link to retrieve the audio file 1105.

At 1106, the audio distribution master (e.g., device C) determines whether to send the audio file 1105 to the slaves in the group (e.g., slave devices B and D in Group 2) via an "External AP mode" or via a "Soft AP mode" (sometimes referred to as the "Hybrid mode"). If the audio distribution master determines to send the audio file 1105 to the slaves in the group via the "External AP mode," the process 1100 follows the "no" route from 1106 to 1108 where the audio file 1105 can be received at the individual slave devices 104 in Group 2 (e.g., devices B and D) via the WAP 117 in the environment 106. That is, execution of the "External AP mode" for audio distribution at block 1108 involves the audio distribution master (e.g., device C) sending copies of the audio file 1105 to the WAP 117, and the WAP 117 forwarding the copies of the audio file 1105 to the slaves (e.g., devices B and D).

At 1110, when all of the devices 104 in Group 2 possess the audio file 1105, audio of the audio file 1105 can be output by the devices 104 in Group 2 (e.g., devices B, C, and D) in a synchronized manner.

If, at 1106, it is determined that the audio file 1105 is to be sent to the slaves in the group via the "Soft AP mode," (or the "Hybrid mode"), then the process 1100 may follow the "yes" route from 1106 to 1112, where the audio file 1105 can be received at individual slave devices 104 in Group 2 (e.g., devices B and D) directly from the audio distribution master (e.g., device C) acting as the soft WAP in a hybrid topology 700. It is to be appreciated that distributing the audio file 1105 at block 1112 may include sending the audio file to some slaves in the group directly, and to other slaves in the group via the local WAP 117. For instance, with the hybrid topology shown in FIG. 7, if the group in question included devices A, B, C, and D, the audio distribution master (device C) may send the audio file 1105 to device A via the local WAP 117, and may send the audio file 1105 to devices B and D directly (i.e., not through the local WAP 117). Thus, the process 1100 allows audio playback devices 104 to dynamically determine whether to use of a soft WAP verses using a local WAP 117 in the environment 106 for distributing audio data amongst the devices 104 in a particular group 316. It is to be appreciated that the devices 104 in a group 316 can be physically located in multiple rooms (e.g., within a house), or in a single room, and the most efficient audio distribution mode described with reference to the process 1100 can be selected.

Figure 12:
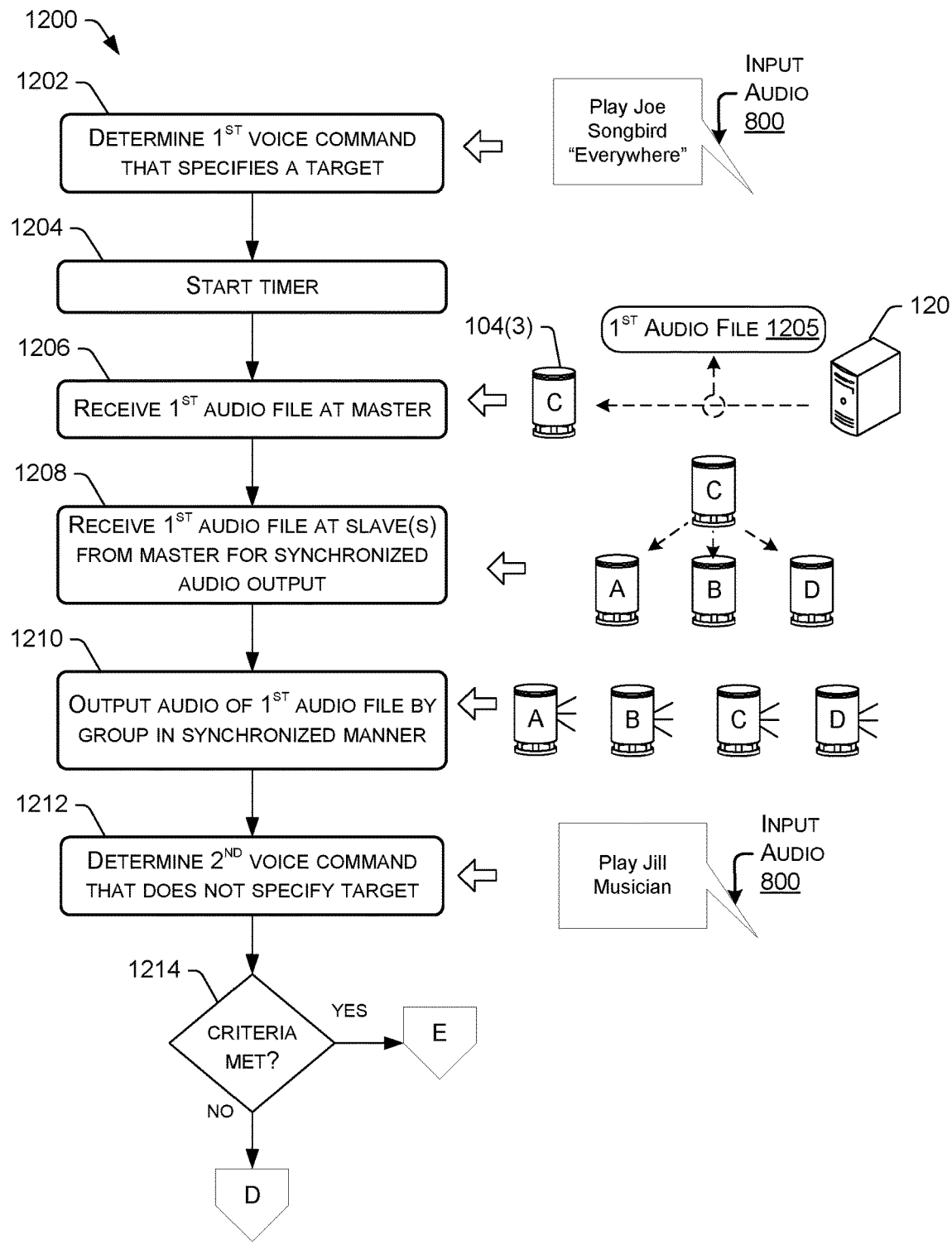
FIG. 12 is a pictorial flow diagram of a portion of an illustrative process for selecting a target for output of audio when a target is not specified in a voice command.

FIG. 12 is a pictorial flow diagram of a portion of an illustrative process 1200 for selecting a target for output of audio when a target is not specified in a voice command. As used herein, "target" or "target device" means a single device 104 or a group of devices 104 that are to output audio. In the case of a single target device, synchronization is not applicable. However, in the case of multiple devices representing a target for output of audio, the audio is to be output by the target (i.e., the multiple devices 104) in a synchronized manner, as described herein.

At 1202, a first voice command can be determined based at least in part on a first utterance in the environment 106, the first voice command specifying a target. For example, the user 102 may utter the voice command "Play Joe Songbird Everywhere", ("Everywhere" corresponding to the target associated with devices A-D). The microphone 218 of device D, may generate audio data 802 based on the input audio 800 corresponding to the utterance, and may transmit the audio data 802 to the remote system 114 for processing the voice command. The remote system 114 can perform the various ASR and NLU techniques described above to generate the first command by the command processor 290, which may be specific to a music domain or service, and the first command can be received by a device 104. The first command may be received by the master receiver, and if the master receiver is different than the audio distribution master device (e.g., device C in the above example), the first command may be forwarded to the audio distribution master. The first command may instruct the audio distribution master to obtain an audio file associated with the artist "Joe Songbird" for initiating synchronized audio playback of the audio file via the group named "Everywhere." In some embodiments, the first command may include an audio playback operation, a first content identifier corresponding to a song by the artist Joe Songbird, and a target identifier associated with the Everywhere group comprising devices A-D. This tells the master receiver and the audio distribution master that the devices in the Everywhere group are to be placed in "group mode" for playback of audio in a synchronized manner via the Everywhere group.

At 1204, a timer can be started that is to run for a predetermined time period. At 1206, device C, being the audio distribution master device of the "Everywhere" group, receives a first audio file 1205 that was ultimately obtained from the content source 119. The audio file 1205 corresponds to the content identifier in the first command. The first content identifier in the first command may be a link (e.g., a URL) pointing to the content source 119 where the audio file 1205 is to be obtained, and the audio distribution master device 104 may use the link to retrieve the audio file 1205.

At 1208, one or more slaves in the group of devices 104 that are to engage in synchronized audio playback of the audio file 1205 receive the first audio file 1205 from the audio distribution master device (e.g., device C).

At 1210, the devices 104 in the "Everywhere" group, which now possess the first audio file 1205, can output audio of the first audio file 1205 in a synchronized manner.

At 1212, a subsequent voice command can be determined wherein the voice command does not specify a target device for playback of audio data. For example, the user 102 may utter the voice command "Play Jill Musician", and the microphone 218 of device D, may generate audio data 802 based on the input audio 800 corresponding to the utterance, and may transmit the audio data 802 to the remote system 114 for processing the voice command. The remote system 114 can perform the various ASR and NLU techniques described above to determine a voice command from the user 102 that relates to audio playback of music from a specified artist, but that does not explicitly specify a target output device 104 (or group 316 of devices).

At 1214, one or more criteria can be evaluated to determine if the one or more criteria are met at a time that the voice command is determined at 1212.

A criterion may be met at 1214 when the predetermined time period has lapsed at a time of, or before, detection of the second utterance corresponding to the second voice command "Play Jill Musician". This may be determined by determining an amount of time since an event, and determining whether the amount of time meets or exceeds a threshold amount of time (i.e., the predetermined time period). It is to be appreciated that the lapse of the predetermined time period can be evaluated from a starting time that is initiated at any suitable point in time. In FIG. 12, the timer is started at 1204, prior to receiving the first audio file at the master device at block 1206. However, in some embodiments, the timer can be started in response to stopping (e.g., stopping, pausing, etc.) the output of the audio of the first audio file sometime after block 1210. For instance, the user 102 may initiate the playback of the first audio content corresponding to the first audio file 1205 by uttering the first voice command determined at block 1202, and subsequently uttering a voice command to stop the music, at which point the timer can be started, and lapse of the predetermined period of time at block 1214 can be evaluated from a point in time when the music was stopped (or paused). Stopping the music may occur in response to an affirmative command (e.g., input) from the user 102, or output of the audio content may timeout, such as when playback of an album finishes playing the last song in an album.

As another example, a criterion may be met at 1214 when audio of the first audio file 1205 is not being output by the group of devices 104 in the Everywhere group. As another example, a criterion may be met at 1214 when the voice command determined at 1212 is not associated with a category of music-related commands (e.g., next, previous, stop, pause, play, etc., may all be categorized as music-related commands such that commands falling outside of this category are determined to not be music-related commands). As another example, a criterion may be met at 1214 when a stored preference exists for a particular device 104 or group 316 of devices 104 to output audio when a target is not specified in a voice command. If these, or other criteria, are not met at 1216, the process 1200 follows the "no" route from 1216 to block 1302 of the process 1300 of FIG. 13, as shown by the off-page reference "D" in FIGS. 12 and 13. In some configurations, the timer can be reset in response to the second utterance being detected regardless of whether the second voice command specifies a target or does not specify a target. In some configurations, the timer can be reset exclusively in cases where a voice command is detected that specifies a target.

At 1302, an implicit target can be determined (or selected) as having the target identifier corresponding to the most recent target, which, in the above example, comprises the "Everywhere" group 316 with devices A-D as members of the group 316. In some embodiments, a command may be received at the audio distribution master device (e.g., device C) that includes an audio playback operation once the implicit target is determined at 1302. For example, the command processor 290 may generate and send a command to the audio distribution master device (e.g., device C) that includes an audio playback operation, a second content identifier corresponding to a song by the artist Jill Musician, and a target identifier associated with the Everywhere group that was determined as the implicit target at 1302. This tells the audio distribution master that the devices in the Everywhere group are to be placed in "group mode" for playback of audio in a synchronized manner via the Everywhere group.

At 1304, device C, being the audio distribution master device of the "Everywhere" group, receives a second audio file 1305 that was ultimately obtained from the content source 119. The audio file 1305 corresponds to the content identifier in the second command based on the second utterance of the user that did not specify a target output device 104 (or group 316 of devices 104).

At 1306, one or more slaves in the group of devices 104 that are to engage in synchronized audio playback of the audio file 1305 receive the second audio file 1305 from the audio distribution master device (e.g., device C).

At 1308, the devices 104 in the "Everywhere" group, which now possess the second audio file 1305, can output audio of the second audio file 1305 in a synchronized manner.

Figure 14:
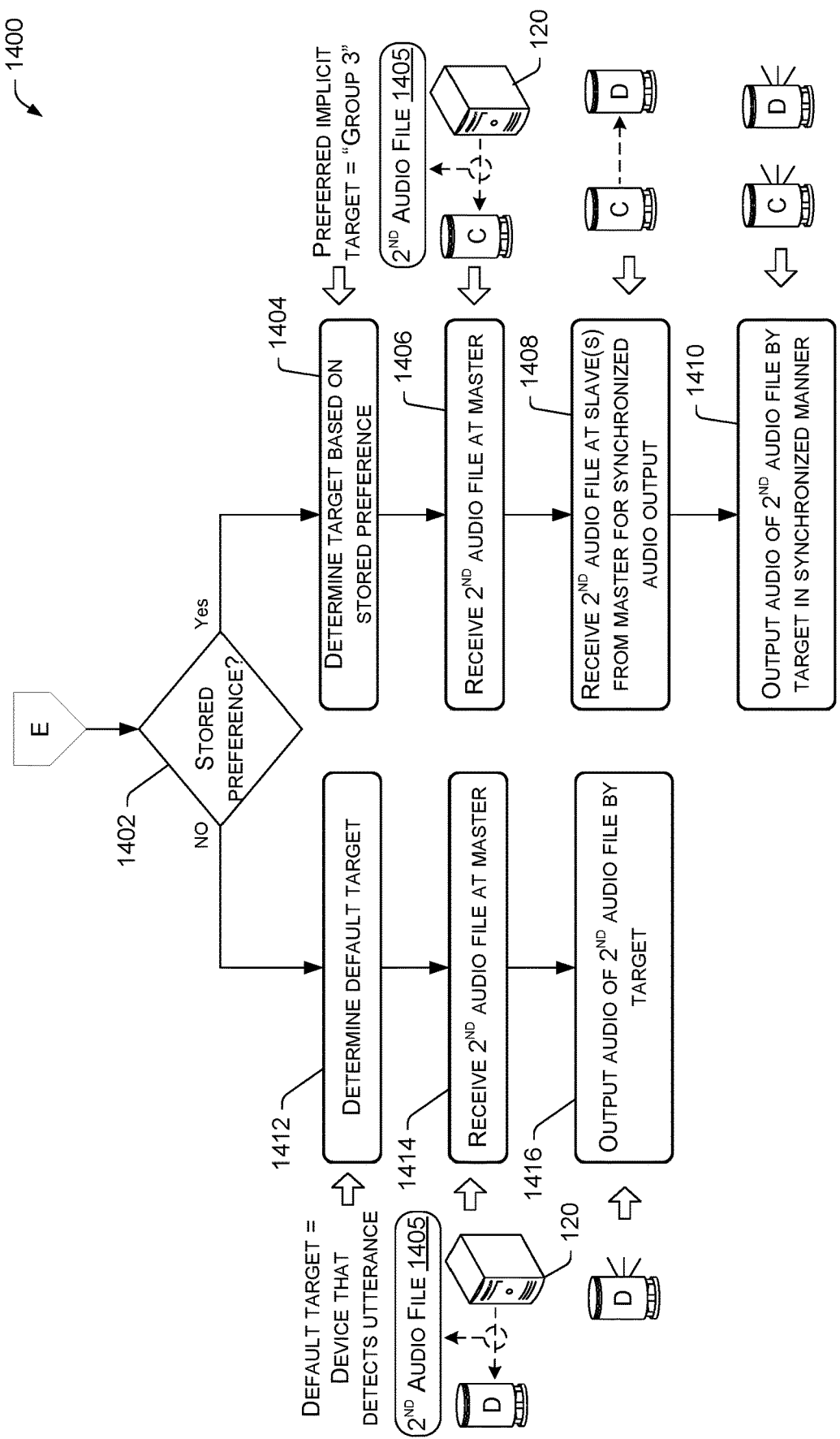
FIG. 14 is a pictorial flow diagram of another portion of the illustrative process for selecting a target for output of audio when a target is not specified in a voice command.

Returning to FIG. 12, if, at decision block 1214, it is determined that one or more of the criteria are met at a time that the voice command is determined at 1212 to not specify a target output device 104 (or group 316 of devices 104), the process 1200 follows the "yes" route from 1214 to decision block 1402 of the process 1400 of FIG. 14, as shown by the off-page reference "E" in FIGS. 12 and 14. It is to be appreciated that, for a criterion that includes lapse of the predetermined time period, the predetermined time period that is evaluated at decision block 1214 may be selected from among multiple different time periods that are mapped to particular devices 104 in the environment. For example, a first time period can be selected if the first utterance is detected by a first audio playback device 104(1) (e.g., device A), while a second time period, different from the first time period, can be selected if the first utterance is detected by a second audio playback device 104(2) (e.g., device B). Thus, the time periods for implicit target selection may vary based on the device 104 that detects the voice command.

At 1402, a determination can be made as to whether there is a stored user preference for determining an implicit target output device 104 (or group 316 of devices 104) when one is not specified in a voice command. For instance, a user 102 may specify a preference to have a group 316 corresponding to devices 104 in the user's 102 living room 112 playback audio when the user 102 does not otherwise specify a target device(s) in a voice command.

If, at 1402, a stored user preference can be identified, the process 1400 proceeds to 1404 where an implicit target can be determined based on the stored preference. In the example of FIG. 14, the target has a target associated with the stored preference has a target identifier corresponding to "Group 3" comprising devices C and D.

At 1406, device C, being the audio distribution master device of Group 3, receives a second audio file 1405 that was ultimately obtained from the content source 119. The audio file 1405 corresponds to the content identifier in the second voice command based on the second utterance of the user 102 that did not specify a target output device 104 (or group 316 of devices 104)—in this case, the content identifier corresponds to a song by the artist Jill Musician.

At 1408, one or more slaves in the group of devices 104 that are to engage in synchronized audio playback of the audio file 1405 receive the second audio file 1405 from the audio distribution master device (e.g., device C).

At 1410, the devices 104 in the Group 3, which now possess the second audio file 1405, can output audio of the second audio file 1405 in a synchronized manner.

If, at decision block 1402, a stored user preference is not identified, the process 1400 follows the "no" route from 1402 to 1412 where a default implicit target may be determined. A default implicit target may be set as any suitable device 104 (or group 316 of devices 104), such as the device 104 that detects the utterance corresponding to the voice command determined at 1212—in this case, device D.

At 1414, an audio playback device 104 receives a second audio file 1405 that was ultimately obtained from the content source 119. The audio file 1405 corresponds to the content identifier in the second voice command based on the second utterance of the user 102 that did not specify a target output device 104 (or group 316 of devices 104)—in this case, the content identifier corresponds to a song by the artist Jill Musician. If the default implicit target is a single device 104, the single device 104 (e.g., device D) can receive the audio file 1405 at 1412. However, if the default implicit target is a group 316 of devices 104, the audio file 1405 may be received by the audio distribution master device, like in the pictorial diagram next to block 1406.

At 1416, the implicit target output device can output audio of the audio file 1405. It is to be appreciated that, if the default implicit target determined at 1412 is a group 316 of devices, one or more slaves in the group of devices 104 that are to engage in synchronized audio playback of the audio file 1405 may receive the second audio file 1405 from the audio distribution master device (e.g., device C), and the group may engage in synchronized output of audio of the audio file 1405.

Figure 13:
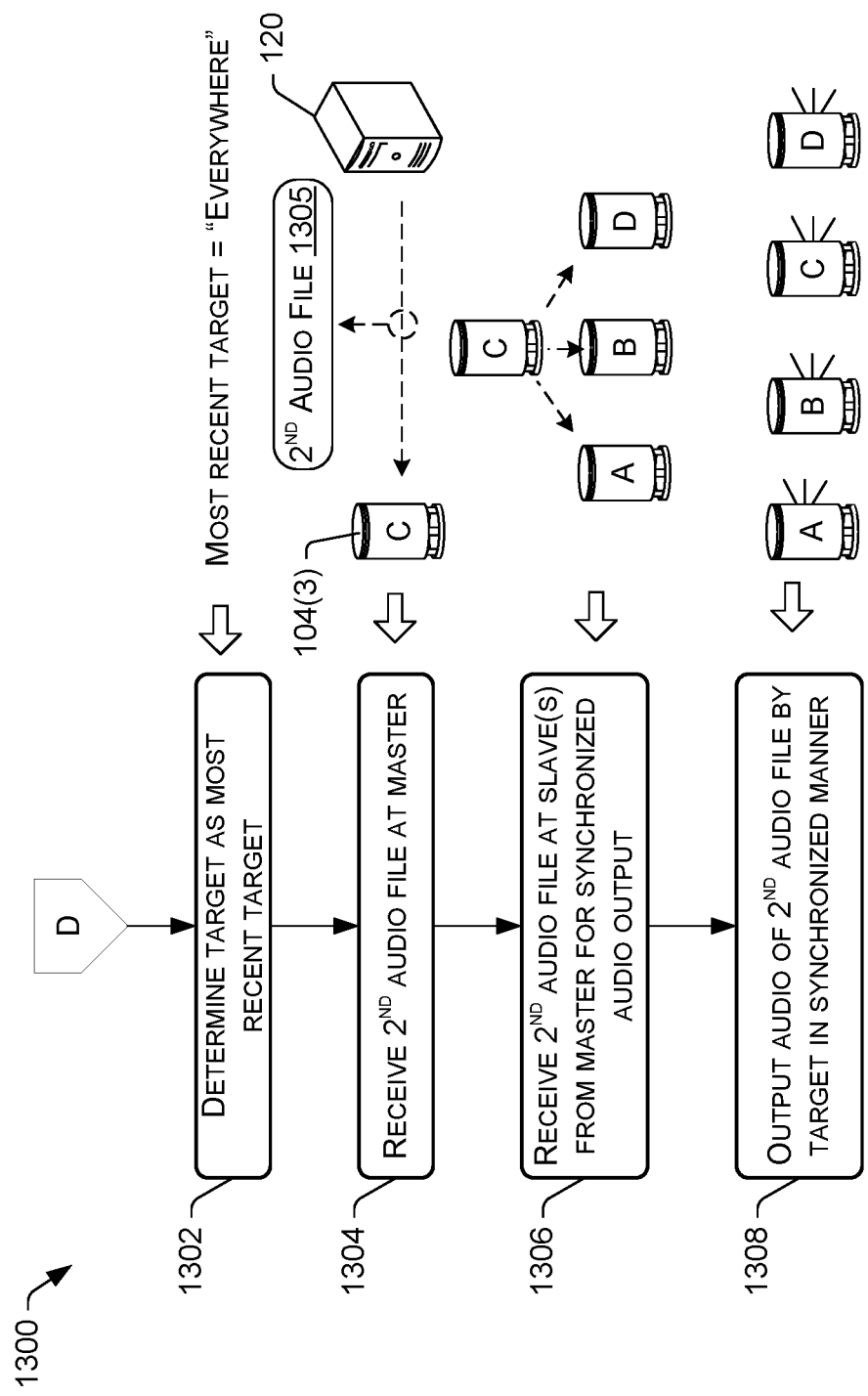
FIG. 13 is a pictorial flow diagram of another portion of the illustrative process for selecting a target for output of audio when a target is not specified in a voice command.

Thus, the combination of processes 1200, 1300, and 1400 in FIGS. 12, 13, and 14, respectively, describe a technique for determining an implicit target output device 104 (or group 316 of devices 104) when a voice command is determined to not explicitly specify a target device. In one scenario, a timer can be utilized, and if the predetermined time period since the most recent voice command has not lapsed at a time that the second voice command is determined at 1212 of the process 1200, the most recent target can be determined as an implicit target. Thus, a user 102 that speaks a voice command to "Play Jill Musician" within a predetermined time period since a voice command to "Play Joe Songbird Everywhere" will experience music from Jill Musician played back on the "Everywhere" group of devices 104. However, if the user 102 utters the same voice command after the time period has lapsed, a preferred target output device(s) 104 may be selected as an implicit target, and if no stored preference is identified, a default target output device(s) 104 can be selected as the implicit target.

In terms of the other criteria that can be evaluated at decision block 1214, FIGS. 12 and 14 illustrate a scenario where, even if the predetermined time period has not lapsed since a time when the user 102 uttered a voice command specifying a particular target (e.g., the "Everywhere" group) different targets than the most recent target can be selected as the implicit target. For example, if it is determined, at 1214, that audio of the first audio file 1205 is not being output by the "Everywhere" group, the algorithm of FIG. 14 selects an implicit target according to a stored preference, or a default target in the absence of a stored preference. Thus, if the user 102 stops playback of the song by Joe Songbird, and then utters "Play Jill Musician" within the predetermined time period, a different target than the most recent target may be selected as the implicit target based on the process 1400. As another example, if it is determined, at 1214, that the voice command determined at 1212 is not associated with a category of music-related commands, the algorithm of FIG. 14 selects an implicit target according to a stored preference, or a default target in the absence of a stored preference. Thus, if music from Joe Songbird is currently playing on the "Everywhere" group of devices 104, and the user 102 utters the voice command "what is the weather like today" (a non-music-related voice command), a different target than the most recent target may be selected as the implicit target to output audio. In this example, the audio output may be a TTS response instead of an audio file.

The environment and individual elements described herein may of course include many other logical, programmatic, and physical components, of which those shown in the accompanying figures are merely examples that are related to the discussion herein.

Other architectures may be used to implement the described functionality, and are intended to be within the scope of this disclosure. Furthermore, although specific distributions of responsibilities are defined above for purposes of discussion, the various functions and responsibilities might be distributed and divided in different ways, depending on circumstances.

Furthermore, although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

What is claimed is:

1. A method comprising:
performing, by a first device, processing on first audio data representing a first utterance to generate first data indicating a first intent to have the first device and a second device output second audio data representing audio content in a synchronized manner;
sending, by the first device and to the second device, the second audio data;
outputting, by the first device, the second audio data in the synchronized manner with the second device;
performing, by the first device, processing on third audio data representing a second utterance to generate second data indicating a second intent to have the first device and the second device stop outputting the second audio data;
sending, by the first device and to the second device, third data corresponding to a command to stop the outputting of the second audio data; and
ceasing, by the first device, output of the second audio data.

2. The method of claim 1, wherein the performing the processing on the first audio data to generate the first data comprises:
performing, by the first device, automatic speech recognition (ASR) processing on the first audio data to generate text data; and
performing, by the first device, natural language understanding (NLU) processing on the text data to generate the first data.

3. The method of claim 1, further comprising, at least partly prior to the sending of the second audio data to the second device, receiving, by the first device, the second audio data from a content source.

4. The method of claim 1, further comprising:
sending, in response to the first device booting, a first device identifier of the first device to a system that is remote from the first device; and
receiving, by the first device and from the system, a second device identifier of the second device.

5. The method of claim 1, further comprising, receiving, by the first device, group information indicating that:
a group of devices including the first device and the second device has been formed; and
the first device has been selected to send, to the second device, the second audio data for synchronized output of the second audio data by the first device and the second device.

6. The method of claim 5, further comprising determining a signal strength value indicating a signal strength between the first device and a wireless access point (WAP), wherein selection of the first device to send the second audio data to the second device for the synchronized output of the second audio data is based at least in part on the signal strength value.

7. A first device comprising:
one or more speakers;
one or more processors; and
memory storing computer-executable instructions that, when executed by the one or more processors, cause the first device to:
process first audio data representing a first utterance to generate first data indicating a first intent to have the first device and a second device output second audio data in a synchronized manner;
send, to the second device, the second audio data;
output the second audio data via the one or more speakers in the synchronized manner with the second device;
process third audio data representing a second utterance to generate second data indicating a second intent to have the first device and the second device stop outputting the second audio data;
send, to the second device, third data corresponding to a command to stop the outputting of the second audio data; and
cease output of the second audio data.

8. The first device of claim 7, wherein the computer-executable instructions, when executed by the one or more processors, further cause the first device to:
perform automatic speech recognition (ASR) processing on the first audio data to generate text data; and
perform natural language understanding (NLU) processing on the text data to generate the first data.

9. The first device of claim 7, wherein the computer-executable instructions, when executed by the one or more processors, further cause the first device to, at least partly prior to outputting the second audio data in the synchronized manner:
receive the second audio data from a content source.

10. The first device of claim 7, wherein the computer-executable instructions, when executed by the one or more processors, further cause the first device to:
send, in response to the first device booting, a first device identifier of the first device to a system that is remote from the first device; and
receive, from the system, a second device identifier of the second device.

11. The first device of claim 7, wherein the computer-executable instructions, when executed by the one or more processors, further cause the first device to receive group information indicating that:
a group of devices including the first device and the second device has been formed; and
the first device has been selected to send, to the second device, the second audio data for synchronized output of the second audio data by the first device and the second device.

12. The first device of claim 11, wherein the computer-executable instructions, when executed by the one or more processors, further cause the first device to determine a signal strength value indicating a signal strength between the first device and a wireless access point (WAP), wherein selection of the first device to send the second audio data to the second device for the synchronized output of the second audio data is based at least in part on the signal strength value.

13. A first device comprising:
one or more speakers;
one or more processors; and
memory storing computer-executable instructions that, when executed by the one or more processors, cause the first device to:
process first audio data representing a first utterance indicating a first request to output second audio data in a synchronized manner;
send the second audio data to a second device;
output, via the one or more speakers, the second audio data in the synchronized manner with the second device;
process third audio data representing a second utterance indicating a second request to have the first device and the second device stop outputting the second audio data;
send, to the second device, first data corresponding to a command to stop the outputting of the second audio data; and
cease output of the second audio data.

14. The first device of claim 13, wherein the computer-executable instructions, when executed by the one or more processors, further cause the first device to generate second data based at least in part on processing the first audio data, the second data indicating an intent to have the first device and the second device output the second audio data in the synchronized manner.

15. The first device of claim 13, wherein the computer-executable instructions, when executed by the one or more processors, further cause the first device to:
perform automatic speech recognition (ASR) processing on the first audio data to generate text data; and
perform natural language understanding (NLU) processing on the text data to generate second data indicating an intent to have the first device and the second device output the second audio data in the synchronized manner.

16. The first device of claim 13, wherein the computer-executable instructions, when executed by the one or more processors, further cause the first device to, prior to sending the second audio data to the second device, receive the second audio data from a content source.

17. The first device of claim 13, wherein the computer-executable instructions, when executed by the one or more processors, further cause the first device to:
send, in response to the first device booting, a first device identifier of the first device to a system that is remote from the first device; and
receive, from the system, a second device identifier of the second device.

18. The first device of claim 13, wherein the computer-executable instructions, when executed by the one or more processors, further cause the first device to receive group information indicating that:
a group of devices including the first device and the second device has been created; and
the first device has been selected to send, to the second device, the second audio data for synchronized output of the second audio data by the first device and the second device.

19. The first device of claim 18, wherein selection of the first device to send the second audio data to the second device for the synchronized output of the second audio data is based at least in part on a type of the first device.

20. The first device of claim 18, wherein selection of the first device to send the second audio data to the second device for the synchronized output of the second audio data is based at least in part on a signal strength between the first device and a wireless access point (WAP).

* * * * *